July 17, 1962 E. LAKATOS ET AL 3,045,231

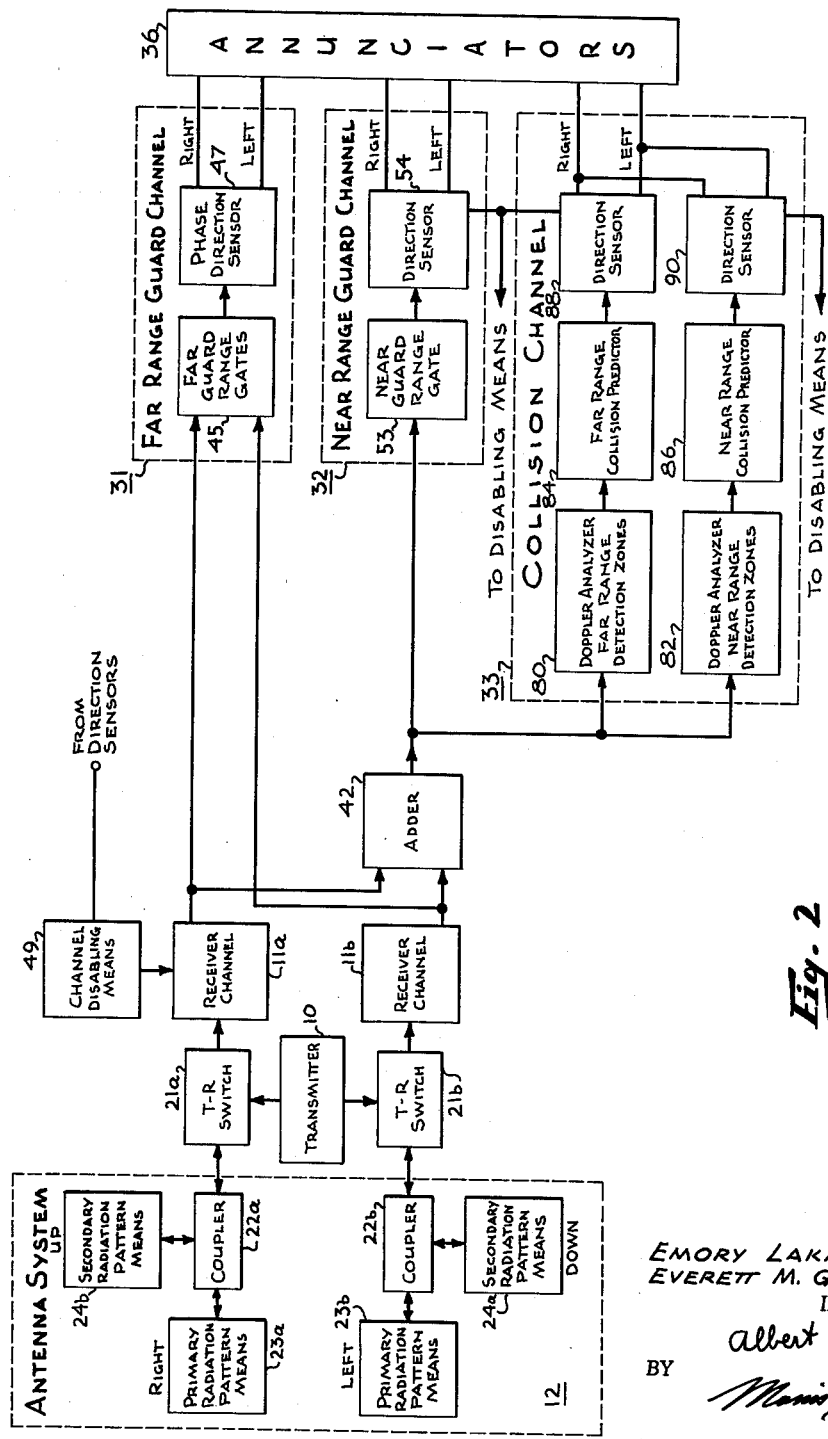

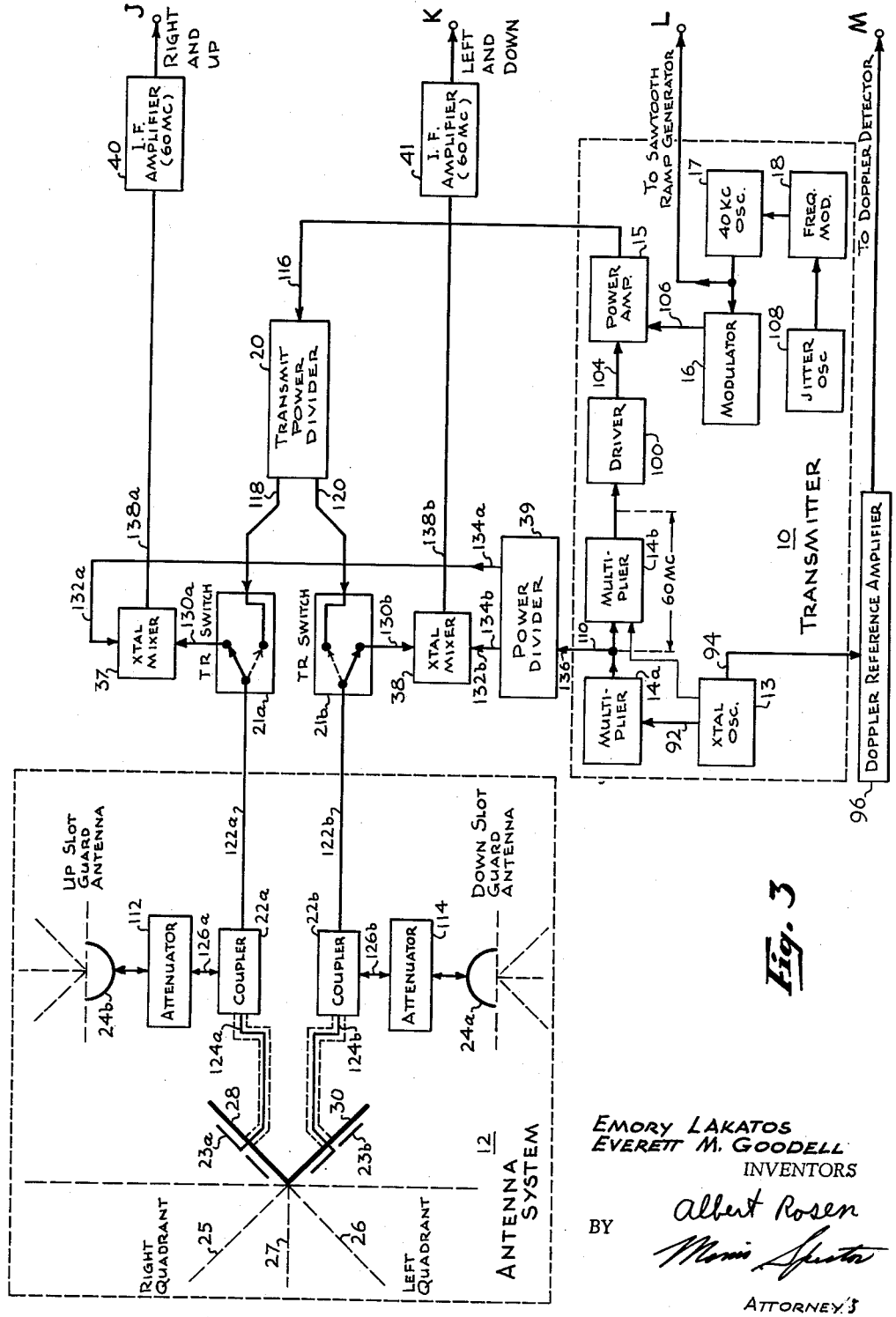

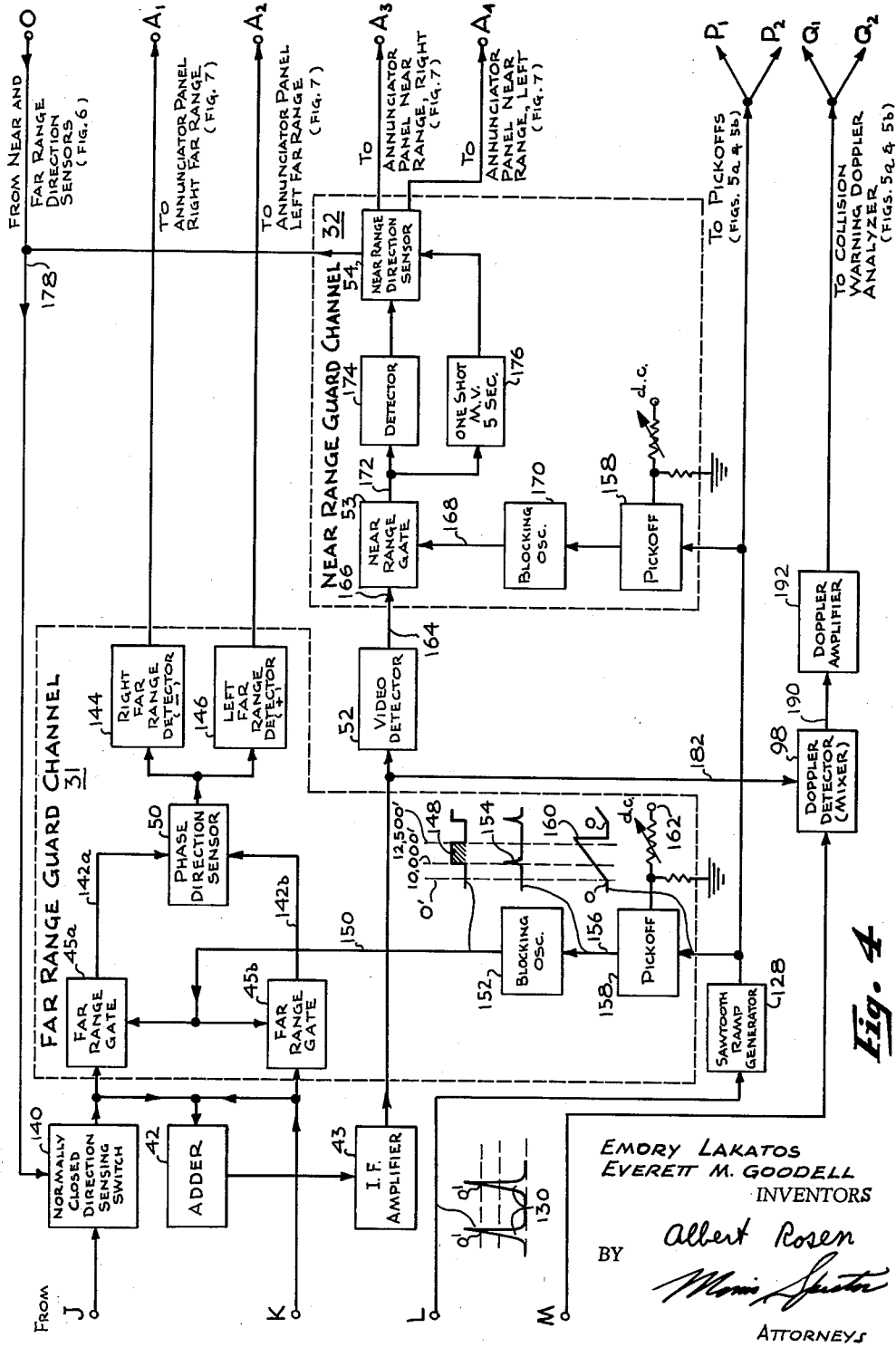

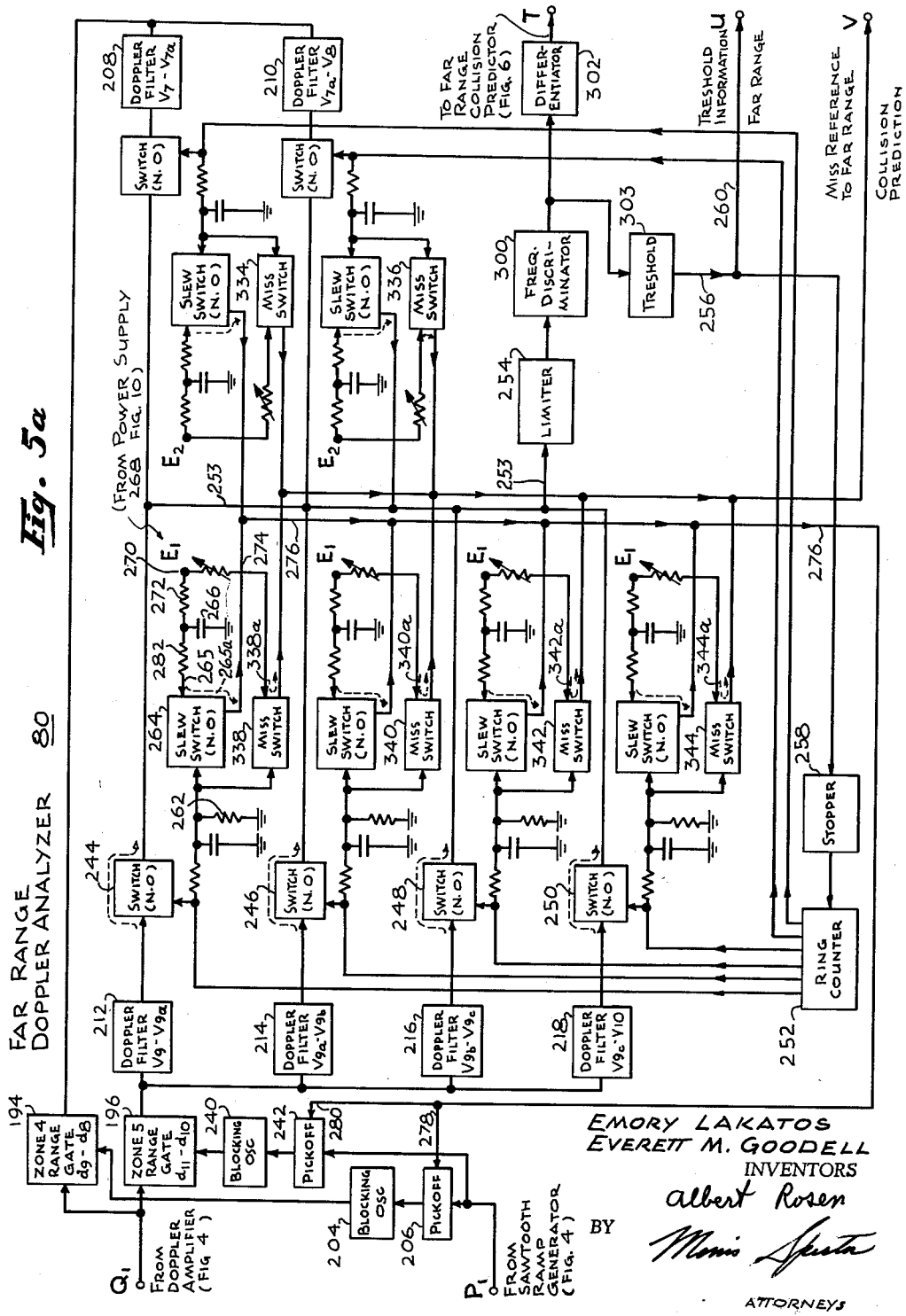

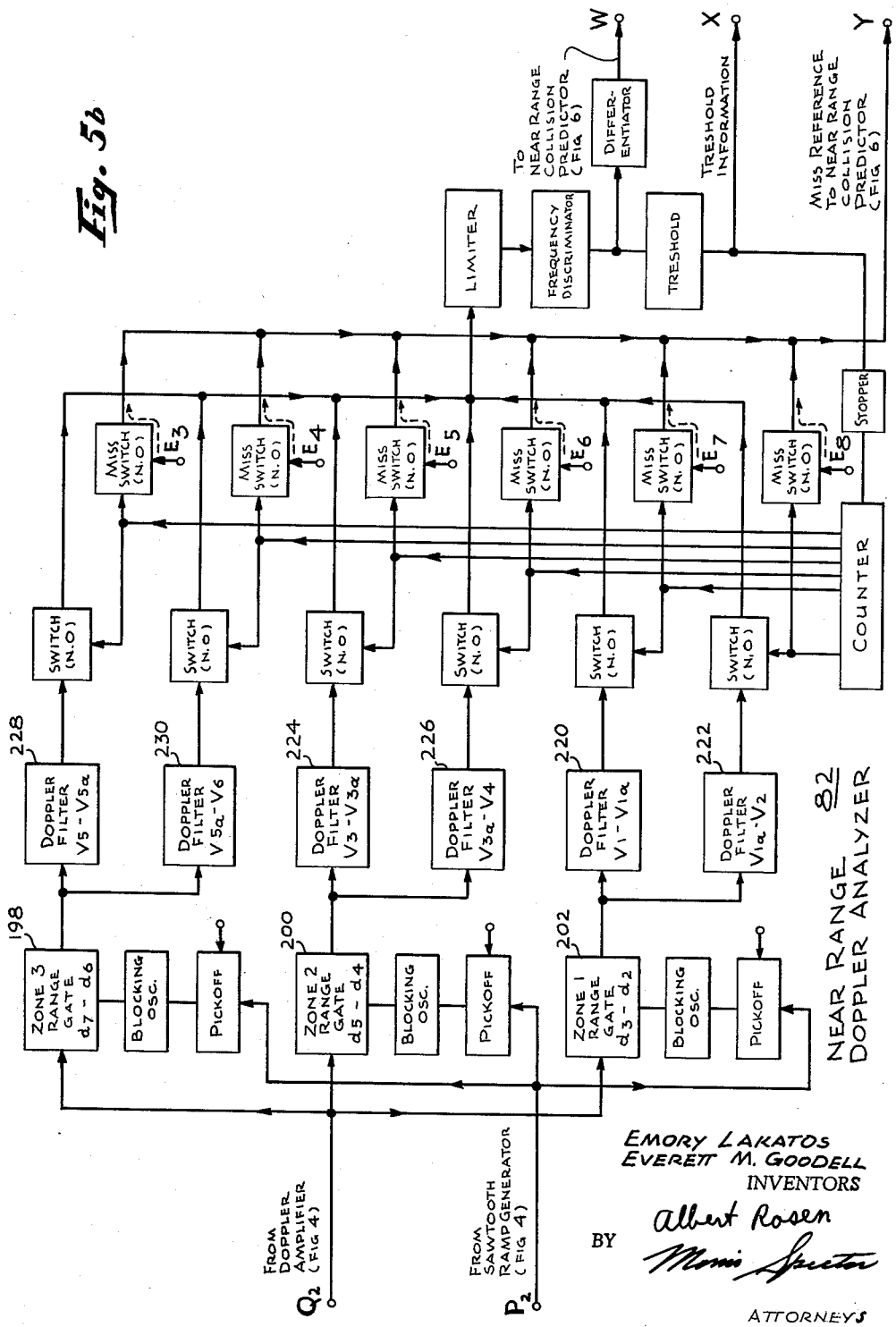

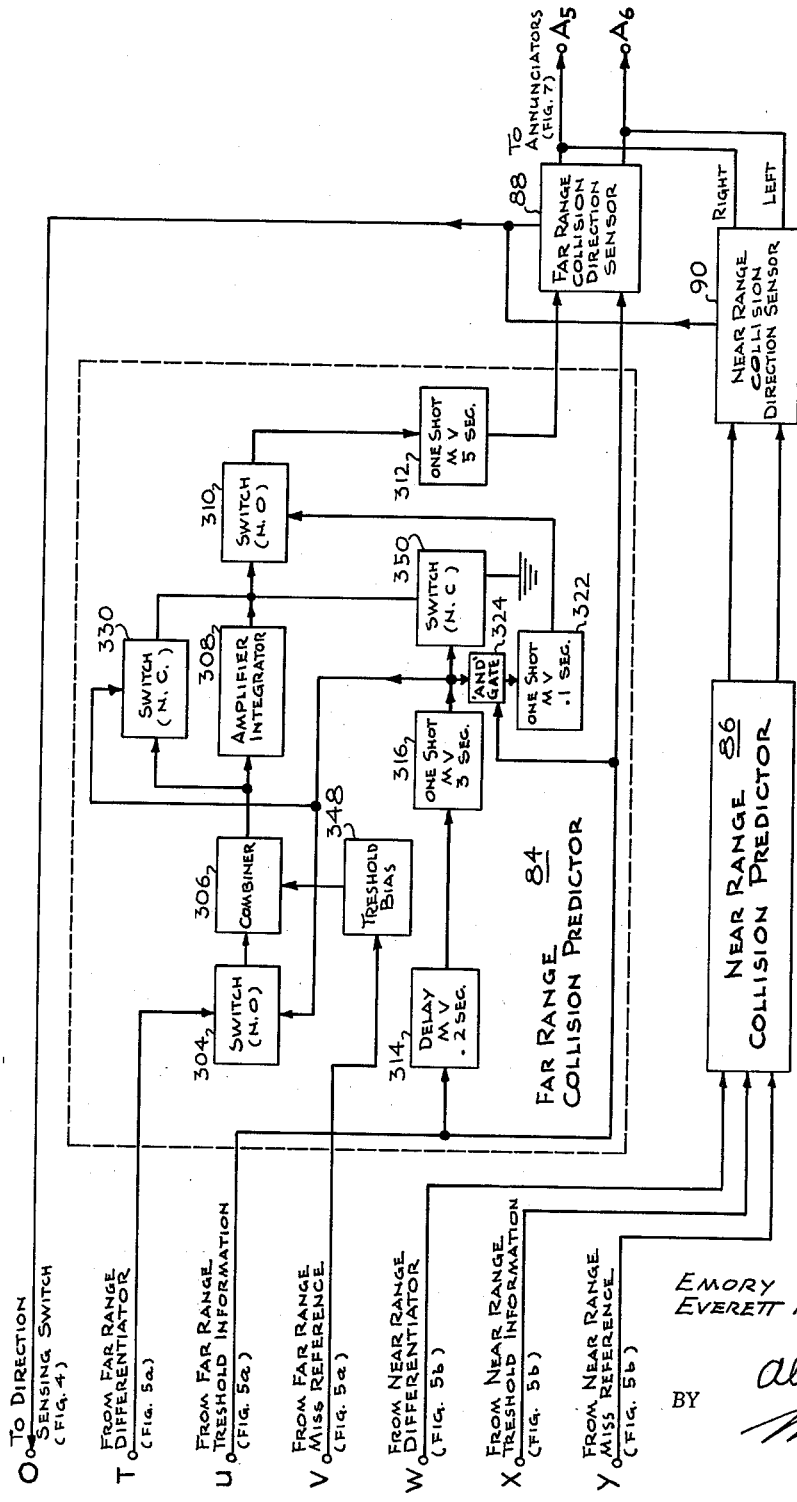

SIGNAL ANALYZING METHOD AND SYSTEM

Filed April 17, 1958 12 Sheets-Sheet 9

EMORY LAKATOS
EVERETT M. GOODELL
INVENTORS

BY Albert Rosen

Morris Liptz

ATTORNEYS

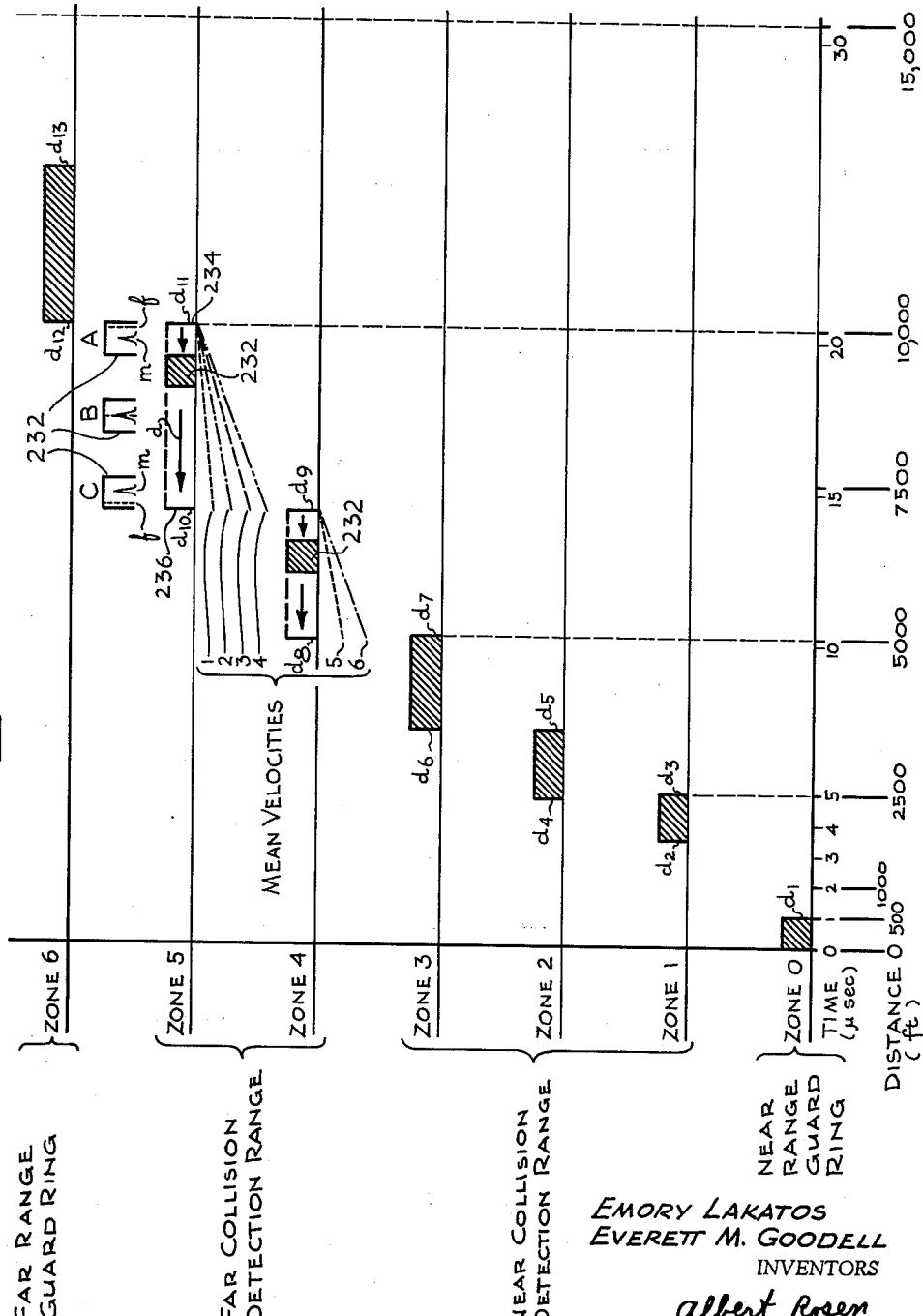

| RANGE GATE NUMBER & TYPE | RANGE ft | GATE WIDTH μs / ft | CLOSING RATE ft/sec | MEAN CLOSING RATE ft/sec | | SPREAD ± MEAN CLOSING RATE ft/sec | MEAN DOPPLER FREQUENCY cps | DOPPLER FREQ. PASS BAND (3db POINTS) cps | MC |
|---|---|---|---|---|---|---|---|---|---|
| 6 FIXED | 12,500 to 10,000 | $d_{13} - d_{12}$ | 5.0 μs / 2500 ft | ANY | --- | | --- | --- | --- | --- |
| 5 TRACKING | 10,000 to 7000 | $d_{11} - d_{10}$ | 1.0 μs / 500 ft | 1000 to 700 | 962.5 887.5 812.5 737.5 | $V_{9c} - V_{10}$ $V_{9b} - V_{9c}$ $V_{9a} - V_{9b}$ $V_{9} - V_{9a}$ | 37.5 | 3850 3550 3250 2950 | 300 | 350 384 415 457 |
| 4 TRACKING | 7000 to 4900 | $d_9 - d_8$ | 1.0 μs / 500 ft | 700 to 500 | 650 550 | $V_{7a} - V_{8}$ $V_{7} - V_{7a}$ | 50 | 2600 2200 | 400 | 350 414 |
| 3 FIXED | 5000 to 3500 | $d_7 - d_6$ | 3.0 μs / 2500 ft | 500 to 350 | 462.5 387.5 | $V_{5a} - V_{6}$ $V_{5} - V_{5a}$ | 37.5 | 1850 1550 | 300 | 350 420 |
| 2 FIXED | 3500 to 2450 | $d_5 - d_4$ | 2.0 μs / 1,050 ft | 350 to 250 | 325 275 | $V_{3a} - V_{4}$ $V_{3} - V_{3a}$ | 25 | 1300 1100 | 200 | 350 414 |
| 1 FIXED | 2500 to 1750 | $d_3 - d_2$ | 1.5 μs / 750 ft | 250 to 150 | 225 175 | $V_{1a} - V_{2}$ $V_{1} - V_{1a}$ | 25 | 900 700 | 200 | 350 450 |
| 0 FIXED | 500 to 0 | $d_1 - d_0$ | 1.0 μs / 500 ft | ANY | --- | | --- | --- | --- | --- |

*Fig. 12*

RANGE & SPEED PARAMETERS

July 17, 1962 E. LAKATOS ET AL 3,045,231
SIGNAL ANALYZING METHOD AND SYSTEM
Filed April 17, 1958 12 Sheets-Sheet 12

AZIMUTHAL FIELD PATTERN

ELEVATION FIELD PATTERN

EMORY LAKATOS
EVERETT M. GOODELL
INVENTORS

BY Albert Rosen

ATTORNEYS

United States Patent Office 3,045,231
Patented July 17, 1962

3,045,231
SIGNAL ANALYZING METHOD AND SYSTEM
Emory Lakatos, Santa Monica, and Everett M. Goodell, Palos Verdes Estates, Calif., assignors, by mesne assignments, to Thompson Ramo Wooldridge Inc., Cleveland, Ohio, a corporation of Ohio
Filed Apr. 17, 1958, Ser. No. 729,118
14 Claims. (Cl. 343—5)

This invention relates to an improved signal analyzing method and system and, in particular, to an improved method and system for detecting the presence of an object and the position and velocity of the object relative to an observer. While not limited thereto, the invention is herein described as embodied in a novel aircraft collision avoidance arrangement for (a) sensing a collision threat (the threat may for example be a nearby aircraft), (b) predicting the course of this threat relative to the observer, and (c) if the threat is on a collision course with the observer, providing information indicative of the response required by the observer to avoid a collision with the threat. While an embodiment of the invention may be designed to operate at radio frequencies (radar) for use in an aircraft, another embodiment of the invention may be designed to operate at ultrasonic frequencies for use in a submarine.

Detecting arrangements are known wherein an object can be sensed by reflected radiation for providing information as to the location and/or velocity of the object relative to the observer. However, in order to provide the noise immunity required for reliable and accurate information the radiation signal-to-noise level heretofore required has been so high as to require relatively complex, bulky, and weighty signal detection and analyzing equipment. Thus, such equipment has not heretofore been completely successful in applications, such as in commercial aircraft, where bulk, weight, and cost have been prime considerations.

Accordingly, an object of this invention is to provide an improved object detecting and analyzing arrangement for furnishing information as to the location and velocity of the object relative to an observer with a maximum of reliability and accuracy and a minimum of equipment cost, weight, and bulkiness.

Another object of the invention is to provide an improved detecting and analyzing method and system for predicting the course of a potential collision threat relative to an observer with a high degree of accuracy and with relatively low power radiation sending and receiving equipment.

A further object is the provision of an improved detecting arrangement capable of analyzing signals representative of a plurality of contemporaneously detected collision threats and providing unambiguous information as to the evasive action required to avoid the most threatening of the collision threats.

Yet another object of the invention is to provide an improved compact, light weight collision threat course prediction arrangement useful in connection with a radar set operating in a relatively low signal-to-noise ratio environment, and wherein the arrangement provides information as to the evasive action required on the part of an observer to avoid a collision threat.

The foregoing and related objects are realized in a collision avoidance arrangement embodying a signal analyzing method and system according to the invention. Firstly, the signal analyzing arrangement is made responsive only to signals indicative of certain functions of detected object distance and velocity. These functions represent the distance and velocity value combinations indicative of a prediction that the object will reach the general vicinity of the observer at a predetermined time in the immediate future. The distance and velocity value combinations are chosen such that this time will be sufficiently large to allow an escape maneuver should it be determined by subsequent signal processing that a given object is on a collision course with the observer. To this end the arrangement of the invention breaks up, into zones, the region of space to be observed. The velocity of an object in any of the zones is then analyzed to determine whether it falls within predetermined bounds, and thus whether the distance and velocity of the object are such that it is a candidate to be further considered as a collision threat. The analyzing of the object by distance and velocity zones allows a relatively small frequency bandwidth to be analyzed at a time so that the effect of noise on the signal is minimized. In order to even further minimize the effect of noise, the more distant zones are examined on a relatively low bandwidth basis as, for example, as to distance and velocity with each of these more distant zones as by being tracked by a relatively narrow tracking channel, so that noise present in the zone under consideration, but outside of the particular channel being tracked, will not enter the analyzing circuitry.

Secondly, the signals having the aforementioned distance and velocity value combinations are then analyzed to determine whether the angular direction of the object with respect to the observer, relative to its speed and distance, is such that it is actually on a collision course with the observer; this analysis determines whether there is a need for an evasive maneuver. This directional determination is realized by measuring the change in closing velocity between the observer and the object moving relative thereto, closing velocity being defined as the relative velocity between the observer and an object as measured along a straight line connecting the two. The incoming signals associated with each object are categorized in accordance with the closing velocity and distance of the object from the observer. The rate of change of closing velocity is then determined; if the distance and closing velocity associated with an object fall within a predetermined range and the rate of change in the value of the closing velocity is below a predetermined value (for a given value of closing velocity)—the range covering those distance and associated velocity change which together indicate that the object will substantially meet the observer—an indication of the need for an evasive maneuver, and the type of maneuver required, is indicated.

The analyzing arrangement according to the invention also includes a provision for the indication of the required evasive maneuver for greatly distant objects, for example, distant mountains, and for exceedingly close objects whose very proximity constitutes a collision threat.

The invention is described in greater detail in connection with the appended 12 sheets of drawings wherein like reference characters refer to like parts or circuit arrangements, and wherein:

FIGURE 2 is a block diagram of the general arrangement of a system constructed in accordance with the invention;

FIGURE 3 is a diagram of the antenna, transmitter, and receiver portions of the system of FIGURE 2;

FIGURE 4 is a diagram primarily concerned with the far and near range guard channel portions of the system of FIGURE 2;

FIGURES 5a and 5b are, respectively, diagrams of the far and near range detection and analyzing portions of the system of FIGURE 2;

FIGURE 6 is a diagram of collision predictor portions of the system of FIGURE 2;

FIGURE 11 is a graphical illustration of the distance and tracking arrangements provided by the system of FIGURE 2 as applied to the regions of space depicted in the illustration of FIGURE 1;

FIGURE 12 is a chart showing the various distance, velocity, acceleration, and tracking arrangements used in practicing one embodiment of the invention.

In General

In order to more clearly understand the operating principles of the present invention and the novel features of advantage offered thereby in processing, analyzing, and/or transducing intelligence signals representative of such data, as for example the distance and velocity of a detected target, description will now be undertaken of a collision warning system suitable for use by aircraft. The system to be described will be based upon the use of Doppler radar techniques, although the present invention is in no way limited in value to association with such techniques.

Figure 1:
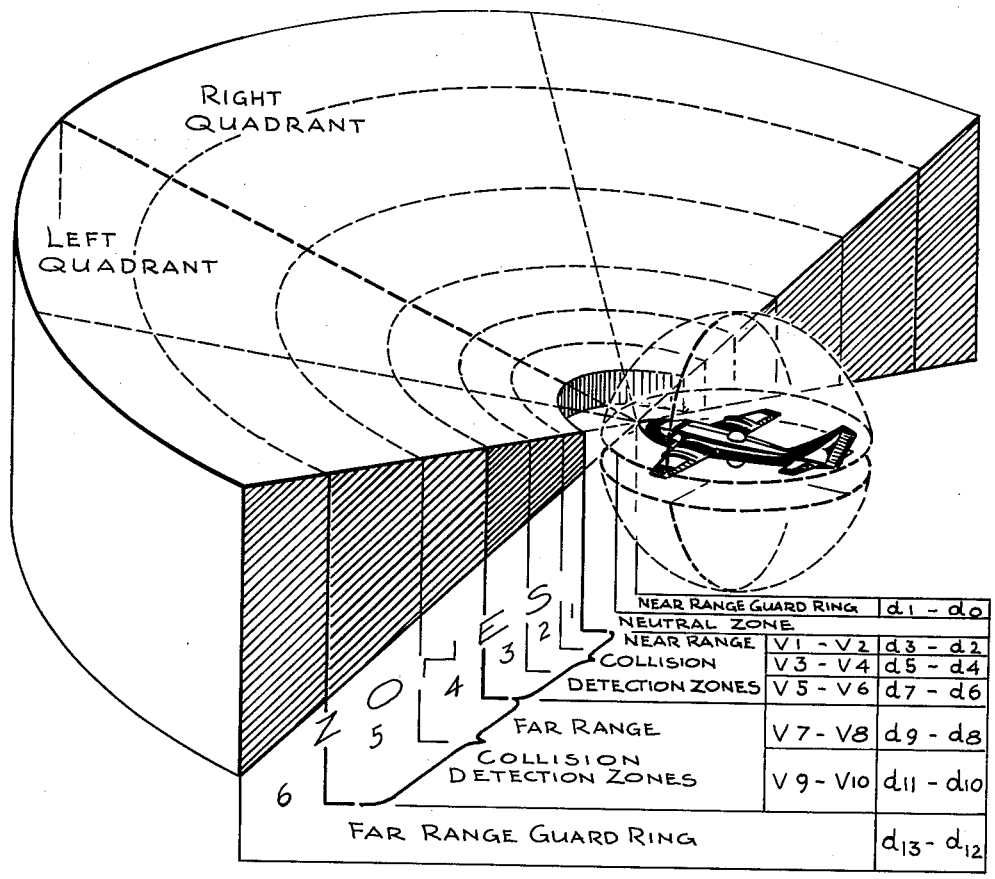
FIGURE 1 is a diagram illustrating the different regions of space observed by portions of the system of the invention in detecting and analyzing the presence and course of objects relative to the observer.

In such a system, in order to develop information as to the evasive maneuver required to avoid a collision, the volume of space observed by a system in which the invention finds especial utility is divided into three categories, each category being used to warn of a different type of collision threat. Specifically, as illustrated in FIGURE 1, the volume of space observed by the system is divided into: (a) a far-range region, herein referred to as a far range guard ring, for detecting the presence of large terrain obstacles at an appreciable distance in a direction forwardly of the observer aircraft, say at a distance range of from 10,000 to 12,500 feet from the aircraft; (b) an intermediate region (with which the invention is especially concerned) herein referred to as being made up of a number of collision detection zones (each having a different association of distance and velocity ranges) for detecting the presence of those objects, forward of the observer aircraft, that may be on a collision course with the aircraft and analyzing the return signals produced by these objects to predict their course, the collision detection zones extending for a distance range of say 1,750 to 10,000 feet from the aircraft; and (c) a near range region, hereinafter referred to as a near range guard ring, for detecting the presence of objects at relatively short distances, say at distance of less than about 500 feet from the aircraft, regardless of direction.

With respect to the far range guard ring (zone 6 in FIGURE 1), signals reflected from a terrain obstacle appearing in a prescribed frontal portion of this guard ring are purposely received at two different forwardly directed antenna systems portions on the protected aircraft. As a result, a phase difference is introduced between the signals at these two portions, the phase difference being measurably related to the direction of the obstacle relative to the system. The two out-of-phase signals are then applied to a far range guard channel that provides directional information, based on the phase angle between the signals, for avoiding the obstacle. Range gating is used to define the limits of the far range guard ring.

In connection with the near range guard ring, signals returned from an object in this region, regardless of the direction or velocity of the object, are received by one of two hemispherically directed antennas, the antennas being designed to receive return or echo signals from, respectively, close objects on opposite sides of the observer aircraft. These opposite sides may be, for example, in directions upwardly and downwardly of the aircraft. Range gating is used to make this guard ring responsive only to objects within a prescribed close distance from the aircraft, say within 500 feet of the aircraft. The general direction of a detected object relative to the aircraft is determined by producing, in response to the detection of an object in the near range guard ring, a biasing signal which is thereafter used to effectively cut out the service of one of the two antennas. If signals continue to be passed to the guard channel, the echo signals must therefore be coming from an object in the direction covered by the antenna whose service was not cut out. Conversely, if no signals are thereafter passed to the guard channel, the echo signals must necessarily be originating in the direction guarded by the antenna whose intercepted signals have been cut out.

As to the intermediate or collision detection zones 1 to 5 of the radiated electromagnetic field: An arrangement according to an embodiment of the invention useful in protecting aircraft is based on the principle that collision warning information is needed only in cases of imminent or near imminent collision, for example 15 seconds before a threatened collision. The provision of a greatly longer warning time period makes for a less accurate and less reliable arrangement since the direction and velocity of either the observer or object to be detected are more likely to change from a collision to non-collision course, or from a non-collision course to a collision course, within a greater warning period. This greater chance for change in course would give rise to a larger number of false collision warning alarms. Likewise, assuming the maximum effective closing velocity of an object to be fixed, the adoption of a warning time greatly in excess of, 15 seconds for example, greatly increases the signal-to-noise problem. Receiver range must be increased and/or transmitter power increased thereby making the equipment more bulky, weighty, and costly.

Signals returned to the observer aircraft from collision threats, such as other aircraft traveling at relatively high speeds through one of the zones, have characteristics that are used to determine whether or not the collision threat and the observer aircraft are on a collision course. These characteristics are used to categorize collision threats as to their closing velocity, distance, rate of change of closing velocity, and direction relative to the protected aircraft. One such characteristic, namely Doppler frequency shift, is proportional to the closing velocity between the system and the detected aircraft, closing velocity being defined as the relative velocity between the system aircraft and the threatening aircraft measured along a straight line connecting the two. The system illustrated by way of example includes a collision channel that provides a signal at the Doppler shift frequency, thereby providing information for categorizing collision threats in terms of their closing velocity. On the other hand, the distance of the detected collision threat is determined by range gating. If the closing velocity and distance of the collision threat in any of the collision detection zones 1 to 5 fall within predetermined distance and velocity combinations which together would cause the object to arrive at the location of the observer aircraft within the given time interval, and if the rate of change of velocity is zero or close to zero, an indication of the danger is provided. The direction of approach of the collision threat is determined by either of the two direction detection methods described.

By breaking up the intermediate region distance and velocity parameters to be sensed by the system into relatively narrow divisions, zones 1 to 5, the effect of noise on the system is reduced. The effect of noise is even further minimized by time sampling some of the more distance zones (far range detection zones 4 and 5) in order to restrict the amount of information that must be analyzed by any portion of the system at one time. In accordance with the present invention, the velocity of the object under observation is broken down into velocity groups correlated with different distance zones so that only critical combinations of velocities and distances are noted by the system of the invention with an attendant increase in noise immunity.

Furthermore, in the system the velocities of the object are analyzed to determine whether their velocities are such as to have them not constitute a danger in view of a course which will bring them close to, but still at an appreciable distance from the observer so as not to constitute an actual collision threat.

By means of the foregoing, it has been found that an aircraft collision avoidance system may be made, embodying the present invention, that will have a relatively small weight and bulk. Since the method and system of the invention finds especial utility in connection with a particular variety of Doppler radar aircraft collision avoidance system (for example of the general type described in greater detail in U.S. Patent Number 2,991,463, issued July 4, 1961, on an application Serial No. 587,768, filed May 28, 1956, entitled "Collision Indication System," by Emory Lakatos et al., and assigned to the same assignee as the present invention), the analyzing arrangement of the invention will be described in connection with this general type of collision avoidance system.

The Collision Avoidance System

Referring now to FIGURE 2, a collision indication system of the type referred to is here illustrated broadly in block diagram fashion. A Doppler radar transmitter as a whole is designated by numeral 10, the entire system receiver is designated by a pair of receiver channels 11a and 11b, and the antenna system, which performs the dual function of radiating the signals generated by the transmitter and relaying return or echo signals to the receiver channels, is generally designated 12. The antenna network 12 radiates into space pulsed energy generated by the transmitter 10. A pair of T-R (transmit-receive) switches 21a and 21b are connected to the transmitter 10, and a pair of directional couplers 22a and 22b (in the antenna system 12) are connected in series between the T-R switches and two sets of radiation pattern producing and receiving means or antennas 23a, 23b, 24a, and 24a (FIGURES 2 and 3).

The system shown makes use of two distinct types of sensing regions for providing information relative to the presence of objects in the regions. The first of the sensing regions extends for an appreciable distance outwardly from the observation aircraft along lines generally concurrent with its path of travel, or generally forwardly for the aircraft, while the second of the regions extends for a short distance in a generally spherical pattern around the aircraft, with the first and second sensing regions being established by the separate pairs of antennas 23a and 23b, and 24a and 24b, respectively. The first set of antennas is made up of a pair of forwardly directed antennas 23a and 23b, and the second set of antennas comprises a set of hemispherically directed antennas 24a and 24b with the antennas of the second set together forming a substantially spherical antenna pattern. The forwardly directed antennas 23a and 23b comprise the primary radiation pattern producing and receiving means for the aircraft to be protected and the hemispherically directed antennas 24a and 24b comprise the secondary radiation pattern producing and receiving means for the aircraft.

Figures 13, 14:
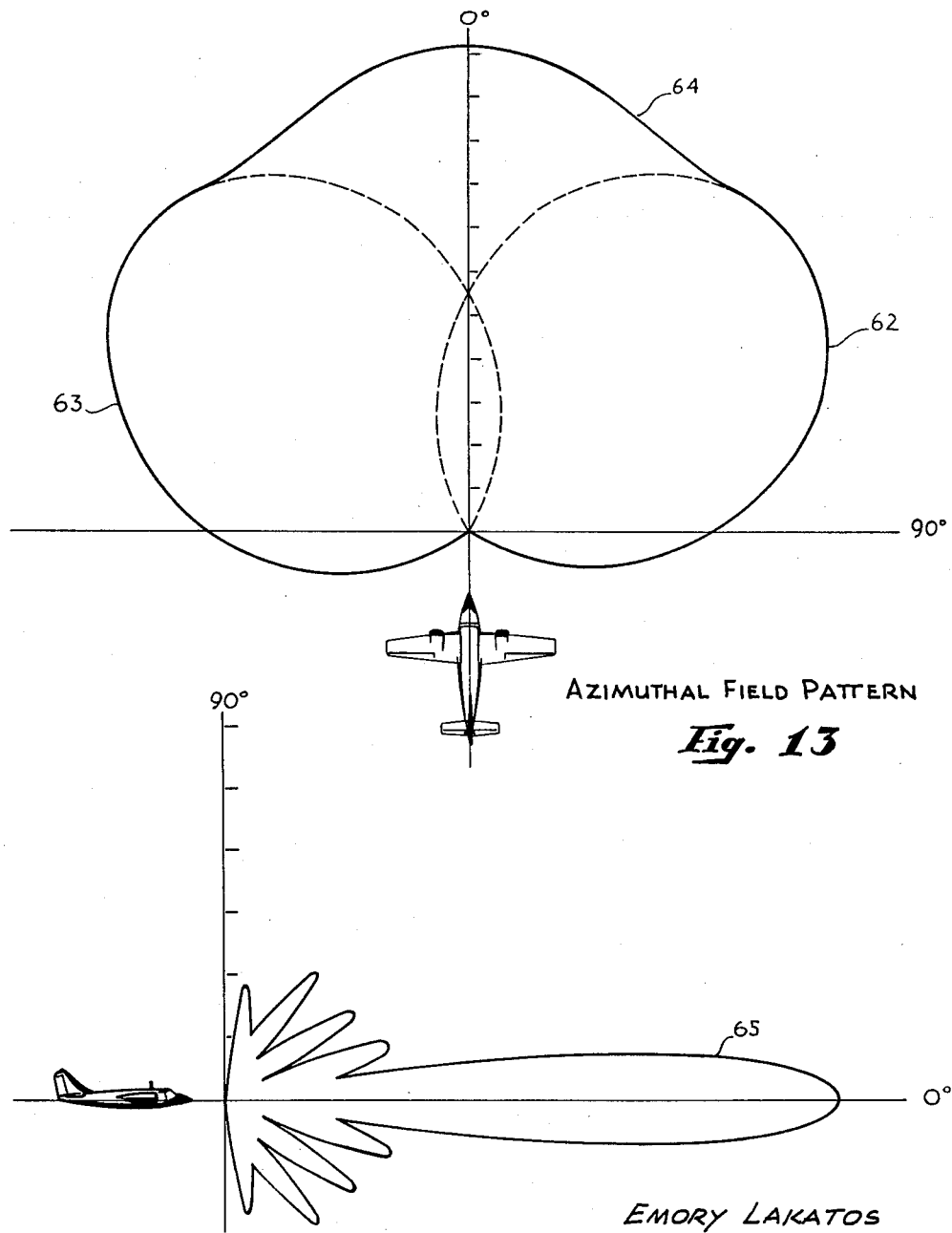
FIGURES 13 and 14 are graphical representations of field patterns taken in, respectively, azimuthal and elevational planes of the antennas used to produce the detection regions designated "Zones" in FIGURE 1.

Referring to FIGURE 13, there is illustrated therein elliptically shaped curves 62 and 63 which represent the individual field patterns for the forwardly directed antennas 23a and 23b (FIGURE 3), respectively, taken in an azimuthal plane, the patterns being typical of those obtained from an antenna backed by a reflector such as the antennas 23a and reflector 28. The combined field pattern for the forwardly directed antennas 23a and 23b, obtained by adding the individual field patterns 62 and 63, is generally designated 64 and, as shown in FIGURE 13, generally resembles a semicircle. The elevational field pattern contour of the forwardly directed antennas is shown in FIGURE 14 and is generally designated 65. The elevational field pattern is generally cigar-shaped, that is, of relatively narrow beam width, and includes a plurality of shorter lobes which are useful in providing additional vertical coverage not obtained from the main lobe 65.

Referring back to FIGURE 2, in the time periods during which signals are received by the antenna system 12 the T-R switches 21a and 21b are operative to pass received signals into the receiver channels 11a and 11b. The signals processed in the receiver channels 11a and 11b are fed to the far range guard processing channel 31, the near range guard processing channel 32, and the collision information analyzing channel 33. The receiver channels 11a and 11b feed their outputs directly to the far range guard processing channel 31 while the near range guard processing channel 32 and the collision channel 33 each receive the sum of the signals provided by the receiver channels 11a and 11b, the sum of the signals received by the receiver channels 11a and 11b being provided by an adder circuit 42.

The signals fed into the far range guard channel 31 are applied to range gates 45 for passing only those signals indicative of objects detected within the distance range limits (for example from 10,000 to 12,500 feet) to be processed by this channel 31. The signals passed through the far guard range gates 45 and then compared with each other in a phase direction sensor 47 for determining whether the detected object lies in a right or left portion of the far range guard ring (FIGURE 1). The phase direction sensor 47 gives an indication of the presence of an object and its relative right or left position in the far range guard ring by actuating an appropriate indicator in a bank of annunciators 36.

The signal fed into the near range guard processing channel 32 from the adder 42 is first subjected to a near guard range gate 53 for determining whether the detected object lies within the near range guard ring, for example a distance of 500 feet in all directions about the observer aircraft. A signal indicative of the presence of such an object is fed into a direction sensor 54 which determines the direction of the sensed object relative to the observer aircraft by momentarily passing a signal to a receiver channel disabling means 49, a circuit that momentarily cuts off one receiver channel 11a. This effectively removes from service the antennas associated with the primary and secondary radiation pattern means 23a and 24b. If the direction sensor 54 continues to receive a signal indicative of the presence of an object, an indication is fed to the annunciators 36 that the detected object lies in the directions handled by the other receiver channel 11b. Conversely, if the received signal is cut off, an indication is given that the object lies in the directions handled by the receiver channel 11a subjected to the channel disabling means 49.

The signal fed into the collision channel 33 from the adder 42 is applied to two separate sets of distance and velocity range gates. These range gates are included in the circuitry referred to in FIGURE 2 by the legends "Doppler analyzer far range detection zones" 80 and "Doppler analyzer near range detection zones" 82. These range gates (explained in detail in connection with FIGURES 5a and 5b) detect combinations of distance and velocity ranges of detected objects which will arrive at the location of the observer aircraft within a predetermined time, say 15 seconds, after the receipt of the signals. If either of the distance and velocity analyzing circuitry 80 or 82 detects such a distance and velocity combination it feeds a signal indicative of this fact to its associated collision predictors 84 or 86, respectively. These collision predictors 84 and 86 study the return signals to determine whether the object and observer will miss each other by a safe margin, say 500 feet or more, even though the object and observer are on a course that will bring them in the same general vicinity. This miss determination is made by analyzing the rate of change of frequency, or Doppler shift, of the return signal. A rate of frequency change more than a predetermined minimum (this predetermined minimum being a function of the distance of the object and is thus different for each of the detection zones 1 to 5 referred to) is indicative of the fact that, while the object and observer are moving generally toward each other, they will miss each other by at least the predetermined safe distance. On the other hand, if no frequency change is observed, or if the rate of frequency change is less than the predetermined minimum for the particular distance zone involved, the determination is made that the object and observer are on a collision course, or that the object and observer will miss each other by less than the safe distance referred to.

Finally, the output from the collision predictors 84 and 86 are fed to, respectively, direction sensors 88 and 90 for determining the direction of approach of the object relative to the observer (that is, whether the object is approaching from the right or from the left) so that the collision warning information applied to the annunciators 36 may take the form of an indication of the course of action to be taken by the observer to avoid the threatened collision. The direction sensors 88 and 90 operate in the manner described above with respect to the direction sensor 54 of the near range guard processing channel 32, namely, by causing the channel disabling means 49 to momentarily disable one receiver channel 11a and observing whether the signal being analyzed continues to be received.

The collision avoidance system will now be discussed in greater detail. Referring to FIGURE 3, the pulsed transmitter 10 includes a crystal oscillator 13 which generates a stable signal at a basic reference frequency. In the embodiment of the invention shown by way of example the frequency of the oscillator signal is 60 megacycles. The oscillator 13 has two output terminals 92 and 94, the first terminal 92 of which is connected to a frequency multiplier circuit made up of two multiplier stages 14a and 14b which increase the frequency of the oscillator signal to some predetermined higher value. In the present case the oscillator signal is multiplied upwardly a number of times from 60 megacycles to a final 2,940 megacycle signal at the output from the second stage 14b. The second of the two oscillator output terminals 94 is connected to a Doppler reference amplifier 96 that is fed through a line M to a Doppler detector or mixer 98 (FIGURE 4) described below.

The output from the second frequency multiplier stage 14b is connected to a driver 100 which in turn is connected in driving relation to a power amplifier 15 through one terminal 104 of two input terminals 104 and 106 to the power amplifier. The output signal from the power amplifier 15 is applied through a circuit connection 116 to a transmitter power divider 20 which equally divides the power delivered by the power amplifier 15 to the two T-R switches 21a and 21b. The second input terminal 106 to the power amplifier 15 is connected to a pulse modulator circuit 16 that generates a train of pulses used to modulate the 2,940 megacycle continuous wave signal applied to the power amplifier 15 by the second frequency multiplier stage 14b.

The pulse repetition rate of the pulse train applied by the pulse modulator circuit 16 is determined by a 40 kilocycle pulse repetition rate oscillator 17 connected to the pulse modulator 16. Consequently, the basic transmitter pulse repetition rate is 40 kilocycles. However, the pulse repetition rate is varied in a prescribed manner from 40 kilocycles to guard against interference from other signals radiated at substantially the same carrier frequency and pulse repetition rate, as from a second similarly equipped aircraft in the vicinity of the observer aircraft. This pulse rate variation is realized by a jitter frequency modulator circuit 18, actuated by a jitter oscillator 108, connected to the 40 kilocycle oscillator 17. A portion of the jitter modulated 40 kilocycle output from the 40 kilocycle pulse repetition rate oscillator 17 is fed via a line L to a sawtooth ramp generator 128 (FIGURE 4). The portion of the output pulses from oscillator 17, these spiked pulses being illustrated at numeral 130 in FIGURE 4, are used to develop a sawtooth ramp signal having a periodicity of 40 kilocycles per second jitter modulated at the same rate as that of the transmitted pulse. Since the transmitter and receiver jitter modulation is derived from the same source, the range gating of the received signals, which is determined by the spiked pulses 130 applied to the sawtooth ramp generator 128, is in synchronism with the transmitted pulses in spite of the jitter modulation provided by the jitter oscillator 108.

Considering the component circuits of the transmitter 10 in greater detail, the crystal oscillator 13 may be an electronically coupled crystal oscillator of the type that is well known in the electronic arts, the crystal being preferably contained in a crystal oven to minimize the effects of temperature change, which change may cause undesirable deviations from the frequency at which the oscillator is designed to operate, 60 megacycles in the present case.

The first frequency multiplier circuit stage 14a may be made up of several tandemly connected doubler and tripler stages that successively multiply the frequency of the oscillator signal until a final frequency is obtained from the first multiplier stage 14a that is 48 times that of the original 60 megacycle signal, namely, 2880 megacycles. The signal at this 2880 megacycle frequency is fed via a line 110 to the receiver portions of the system to provide the required intermediate frequency signal, as will be explained below. The second frequency multiplier circuit stage 14b includes a mixer circuit for the purpose of producing a 2940 megacycle signal by heterodyning the 2880 megacycle signal received from the first multiplier circuit stage 14a against a 60 megacycle signal generated by the oscillator 13. It is by this means that the 2940 megacycle carrier frequency is produced. Since conventional doubler, tripler, and mixer circuits may be used in the multiplier circuit stages 14a and 14b, no further description of them is deemed necessary.

The power amplifier 15 may be a multi-cavity klystron or similar microwave frequency tube which, when actuated, supplies the required power to the antenna system 12. Various types of klystrons and other microwave tubes that may be utilized herein are shown and described throughout volume 7 of the MIT Radiation Laboratory Series, entitled "Klystrons and Microwave Tubes," by Donald R. Hamilton, Julian K. Knipp and J. B. Horner Kuper, published in 1948 by the McGraw-Hill Book Company, Inc., New York.

The jitter frequency modulator circuit 18 basically comprises two circuits, one a sawtooth generator circuit that, as the name implies, produces sawtooth signals, and the other a circuit that produces a signal whose frequency varies with the voltage of the sawtooth signal produced by the sawtooth generator. A reactance tube modulator is customarily used for the latter circuit and is preferred herein, the reactance tube modulator operating to vary the inductance of a frequency-determining tank circuit of an oscillator, thereby producing the desired frequency modulated signal.

The 40 kilocycle or pulse repetition rate oscillator 17 generally comprises a standard type of audio oscillator adjusted to provide a 40 kilocycle signal, the signal being produced at 40 kilocycles by means of a tank circuit tuned to that frequency. The reactance tube modulator heretofore mentioned is customarily connected in parallel with the 40 kilocycle tank circuit and continuously tunes the tank circuit over a predetermined, usually narrow, range of frequencies by varying the value of inductance in the tank circuit in accordance with the voltage amplitude of the sawtooth signal generated in the frequency modulator circuit 18. The pulse repetition rate oscillator 17 may also include a 40 kilocycle magnetic chopper amplifier that takes the sinusoidal output of the audio oscillator and produces a square wave signal therefrom.

The pulse modulator 16 preferably includes a lumped constant transmission line type of pulse-forming network, a discussion of which is presented on pages 175 through 224 of volume 6 of the aforementioned MIT Radiation Laboratory Series, entitled "Pulse Generators," by G. N. Glascoe and J. B. Lebacqs, published in 1948 by the McGraw-Hill Book Company, Inc., New York. The pulse modulator 16 serves the purpose of converting the above-mentioned square wave signal from the oscillator 17 into a train of unidirectional rectangular pulses of proper duration and energy content, the pulse train being applied to the power amplifier 15 to recurrently activate it for controlling the release of the pulses of energy from the transmitter 10.

The antenna network 12 radiates into space the pulsed energy generated by the transmitter 10. The antenna system 12 receives the transmitter energy through the transmitter power divider 20 that equally divides the transmitter output power and passes the power through the T-R switches 21a and 21b into the antenna couplers 22a and 22b and to the forwardly directed and hemispherically directed antennas 23a and 23b, and 24a and 24b, respectively. Attenuators 112 and 114 may be inserted, respectively, between the couplers 22a and 22b and their respective hemispherically directed antennas 24b and 24a to assure that the hemispherically directed antennas operate at an appreciably lower power than the forwardly directed antennas in spite of the fact that all of the antennas are energized from the same energy source, the single transmitter 10.

More specifically, the transmitter power divider 20 is a 3-ended device which equally divides the signal power applied to its input end 116 to produce therefrom two identical signals of equal power at its output ends 118 and 120. In the present instance the input end 116 of the divider 20 is connected to the power amplifier 15 of the transmitter 10 and the two output ends 118 and 120 are connected to the T-R switches 21a and 21b, respectively. Several power dividers that may be used in the present embodiment are shown and described on pages 516 through 528 of volume 9 of the aforementioned MIT Radiation Laboratory Series, entitled "Microwave Transmission Circuits," by George L. Ragan, published in 1948 by the McGraw-Hill Book Company, Inc., New York.

The T-R switches 21a and 21b are also connected to, respectively, crystal mixer circuits 37 and 38 of the receiver channels 11a and 11b (FIGURE 2) and to the direction couplers 22a and 22b, the T-R switches serving to alternately connect the transmitter 10 and the receiver channels to the direction couplers and, therefore, ultimately to the various antennas 23a, 23b, 24a, and 24b. A number of T-R switches that may be employed in the embodiment illustrated are descirbed on pages 226 through 375 of volume 14 of the MIT Radiation Laboratory Series referred to, entitled "Microwave Duplexers," by Louis N. Ridenour, published in 1948 by the McGraw-Hill Book Company, Inc., New York.

The directional couplers 22a and 22b are devices that are generally similar to the transmitter power divider 20 in that each coupler is also a 3-ended device, but with the difference that the directional couplers divide the output power therefrom in some unequal prescribed ratio with respect to the power applied to its input end. As illustrated in FIGURE 3, the input ends 122a and 122b of, respectively, the directional couplers 22a and 22b are connected to the T-R switches 21a and 21b, respectively, and the two output ends 124a and 126a of one directional coupler 22a are respectively coupled to the right and upwardly directed antennas 23a and 24b, and the two output ends 124b and 126b of the other directional coupler 22b are respectively coupled to the left and downwardly directed antennas 23b and 24a. As indicated above, the connection between each of the couplers and its respective hemispherical antenna may be made through an attenuator for reducing the signal strength of the signal received from these antennas. While the right and upwardly directed antennas are here illustrated as being coupled together, it will be understood that, instead, the right and downwardly directed antennas may instead by coupled together (with the left and upwardly directed antennas coupled together). Since the forwardly directed antennas 23a and 23b are required to receive intelligible signals over a distance appreciably greater than that of the hemispherically directed antennas 24a and 24b, the directional couplers 22a and 22b are constructed to couple appreciably more energy between the T-R switches 21a and 21b and the forwardly directed antennas 23a and 23b than between the T-R switches and the hemispherically directed antennas 24a and 24b. If the directional couplers are such that the required ratio of energy is distributed between the forwardly and hemispherically directed antennas without the use of attenuators, the attenuators 112 and 114 (FIGURE 2) may be dispensed with, the couplers than being directly coupled to the hemispherical antennas. Directional couplers that may be adapted for use in the embodiment illustrated are shown and described in detail on pages 854 through 987 of volume 11 of the MIT Radiation Laboratory Series, entitled "Technique of Microwave Measurements," by Carol G. Montgomery, published in 1947 by the McGraw-Hill Book Company, Inc., New York.

Considering the antennas in further detail, the forwardly directed antennas 23a and 23b are preferably broadside arrays of dipoles and are also preferably oriented with respect to each other so as to form a 90 degree angle therebetween, as indicated by dashed lines 25 and 26. Dashed line 27 is a center line and divides the angle formed by the antennas 23a and 23b into two smaller equal angles, each smaller angle therefore being substantially 45 degrees. Immediately behind the antennas 23a and 23b, and insulated therefrom, are a pair of reflectors 28 and 30, respectively, the reflectors being oriented in the same manner as the antennas, as shown in FIGURE 3, and being spaced approximately one-quarter wave length therefrom to produce unidirectional field patterns.

Due to the presence of the reflecting shields 28 and 30, for all practical purposes only signals reflected from a target positioned within the 90 degree frontal angle defined by dashed lines 25 and 26 will be received by both forwardly directed antennas 23a and 23b. In other words, signals reflected from a target lying in the angle defined by the right antenna 23a and dashed line 25 will be reflected by the shield 28 and, therefore, for all practical purposes the reflected signal wave front will never reach the left antenna 23b. Likewise, for targets in the angular region defined by the left antenna 23b and dashed line 26, wave fronts of signals reflected from these targets will never reach the right antenna 23a.

With respect to the hemispherical antennas 24a and 24b, these antennas are used to obtain hemispherical coverage above and below the aircraft and, although truly hemispherical radiation patterns are not obtainable in practice, they can be approximated by making the antennas 24a and 24b flush-mounted and cavity-backed circumferential slots located approximately in the fuselage of the aircraft bearing them. While the hemispherical antennas have been described as being oriented upwardly and downwardly of the protected aircraft it will be appreciated that these antennas may instead by oriented to cover hemispherical regions to the right and left of the observer aircraft. In such a case the right hemispherical antenna is preferably connected to the right forwardly directed antenna and the left hemispherical antenna to the left forwardly directed antenna.

The receiver channels 11a and 11b (FIGURE 2) comprise the mixer circuits 37 and 38 (FIGURE 3), each mixer circuit having first and second input terminals 130a and 132a, and 130b and 132b, respectively. The first input terminals 130a and 130b of each of the mixer circuits 37 and 38 are connected to the T-R switches 21a and 21b, respectively, and the second input terminals 132a and 132b of these mixers are connected, respectively, to the two output ends 134a and 134b, respectively, of a receiver power divider 39 whose input end 136 is connected to receive the 2880 megacycle signal produced by the first frequency multiplier stage 14a of the transmitter 10. The receiver power divider 39 may be substantially the same as the transmitter power divider 20 in that it applies two 2880 megacycle signals of equal power to the mixer circuits 37 and 38. The mixer circuits 37 and 38 are connected, respectively, at their output ends 138a and 138b to a pair of intermediate frequency preamplifiers 40 and 41, respectively, which in turn are connected through lines J and K, respectively, to a conventional adder circuit 42 (FIGURE 4), and to, respectively, right and left far range gates 45a and 45b of the far range guard channel 31 (FIGURE 4). One of the output lines J from the intermediate frequency amplifier 40 includes a serially connected normally closed direction sensing switch 140 (FIGURE 4), the function of which will be discussed below.

Figure 7:
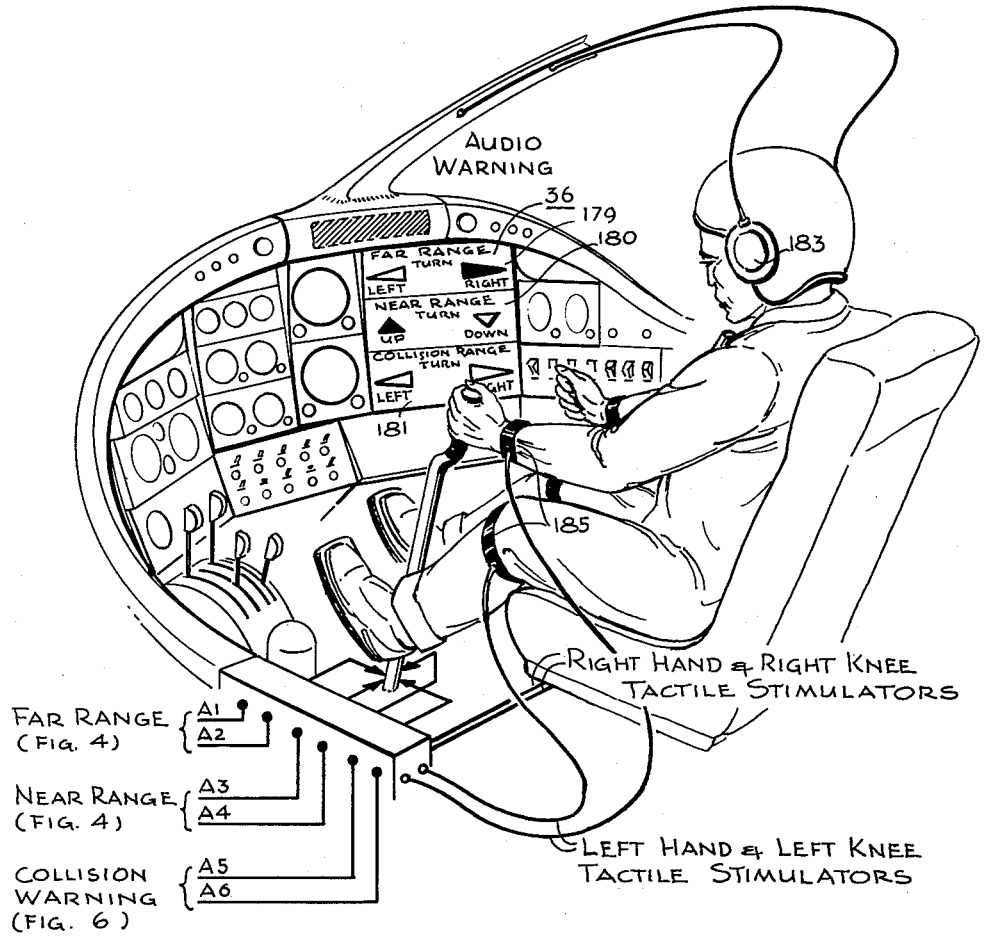
FIGURE 7 is a pictorial illustration of an aircraft cockpit annunciator arrangement useful in connection with the system of FIGURE 2.

Referring now to FIGURE 4, the far range guard channel 31 comprises the pair of far range gate circuits 45a and 45b connected, respectively, to receive signals through lines J and K from, respectively, the preamplifiers 40 and 41 (FIGURE 3). The output ends 142a and 142b of the two range gate circuits 45a and 45b, respectively, are connected to the two input terminals of a phase direction sensor 50. The phase direction sensor 50 is connected to actuate a right or left far range detector 144 or 146, respectively, which determines the directional indication applied to the desired indicator 179 in a bank of annunciators 36 (FIGURE 7) through terminals A1 and A2. Considering the elements of the far range guard channel 31 in greater detail, the range gate circuits 45a and 45b are each of the kind that will only pass signals returned from a target located between predetermined upper and lower range or distance limits from the observer aircraft, for example between distance limits of 12,500 feet and 10,000 feet. Each of the range gate circuits 45a and 45b comprises a usual gating circuit, many of which are well known in the art. The gating circuits are normally in an inoperative condition, as by being biased beyond cut off, and hence will not normally pass signals applied to them. However, in response to a signal 148, applied to the gate circuits 45a and 45b through a line 150, both gate circuits are rendered operable to pass signals which may be applied to them for the duration of the signal 148. As indicated in FIGURE 4, the intervals of time between the leading edges of successive unblocking signals 148, corresponding to a lower target range limit of 10,000 feet, and the lagging edges of the pulses, corresponding to an upper target range limit of 12,500 feet, correspond to the intervals of time during which the far range gates 45a and 45b are unblocked. As illustrated in the chart of FIGURE 11, with respect to zone 6 thereof, these 10,000 foot and 12,500 foot distances correspond to, respectively, time periods of a little more than 20 and 25 microseconds after the transmission of a pulse by the antenna system 12.

The unblocking signals 148 applied to the far range gates 45a and 45b are produced through the agency of a conventional blocking oscillator 152 triggered by pulses 154 received through a line 156 connected to a conventional pickoff circuit 158. The pickoff circuit 158 receives a sawtooth signal 160 from the sawtooth ramp generator 128 and generates a voltage spike, signal 154, at a time interval established by the magnitude of the direct current threshold potential applied to the pickoff circuit 158. This direct current threshold potential is applied to the pickoff circuit 158 through a terminal 162.

With respect to the phase direction sensor 50, this is a type of circuit that produces an output voltage whose polarity is indicative of the phase angle between the two signals applied thereto, a number of such circuits being well known in the art. A number of phase detector circuits that may be adapted for providing the phase direction sensing required of the far range guard channel 31 are shown and described on pages 511 to 524 of volume 9 of the MIT Radiation Laboratory Series, entitled "Waveforms," published in 1949 by the McGraw-Hill Book Company, Inc., New York. As indicated before, the phase direction sensor 50 operates on the principle that signals reflected from a terrain obstacle appearing in a prescribed frontal portion of the far range guard ring are purposely recevied at the two separate forwardly directed antennas 23a and 23b. As a result, a phase difference is introduced between the signals at these two antennas, the phase difference being measurably related to the direction of the detected obstacle relative to these antennas. The polarity is a measure of the direction of the obstacle relative to the observer aircraft.

The near range guard channel 32 receives a signal from the antenna system 12 (FIGURE 2) through an intermediate frequency amplifier 43, connected to the adder circuit 42, and through a video detector circuit 52. The output end 164 of the video detector circuit 52 is connected to the first terminal 166 of two input terminals of a near range gate circuit 53, which circuit is basically the same as either of the far range gate circuits 45a and 45b of the far range guard channel 31. The second input terminal 168 to the near range gate circuit 53 is connected to a blocking oscillator 170, controlled by a pickoff circuit 158. The blocking oscillator 170 and pickoff circuit 158 are basically the same as the blocking oscillator and pickoff circuit 152 and 158, respectively, of the far range guard channel 31 but with the difference that the near range guard channel circuits 158 and 170 have voltage and timing relationships to open the near range gate 53 substantially simultaneously with the transmission of a signal by the transmitter and to close the near range gate at a time interval corresponding to the reception of signals reflected from a target at a distance of about 500 feet from the antenna system. As illustrated in the portion of the chart of FIGURE 11 referred to in connection with zone 0, the near range gate remains open for a time duration of about 1 microsecond.

The direction sensor circuit 54 (FIGURE 2) of the near range guard channel 32, described in detail below in connection with FIGURE 8, operates by momentarily cutting out one of the near range antennas from the receiving channel. If signals continue to be passed to the receiving channel, the signals must be coming from an object in a direction covered by the antenna whose signals were not cut out. Conversely, if no signals are received after the cut out of one of the antennas, the signals must necessarily be originating in the direction guarded by the antenna whose intercepted signals have been cut out. To this end the near range gate output terminal 172 is applied to a detector circuit 174 and to a one-shot, 5 second multivibrator 176. The output of the detector circuit 174 momentarily sends an actuating pulse through line 178 to the normally closed direction sensing switch 140 for opening the circuit to signals received from the upwardly directed hemispherical antenna 24b. (The signals received by the near range guard channel 32 from the right forwardly directed antenna 23a are also cut off but, as will be explained below, direction sensing information is not required with respect to near range information received by the forwardly directed antennas 23a and 23b.) If an output signal from the detector circuit 174 persists, the direction sensor 54 produces an indicating potential on line A4 producing a signal indicative of the directional evasive action required to avoid a collision with the detected object. Thus, an appropriate signal is indicated on the near range panel portion 180 (FIGURE 7) of the annunciators 36. The one-shot, 5 second multivibrator 176 actuates the panel portion 180 and maintains an indication on the panel for the 5 second duration of the multivibrator output.

Figure 8:
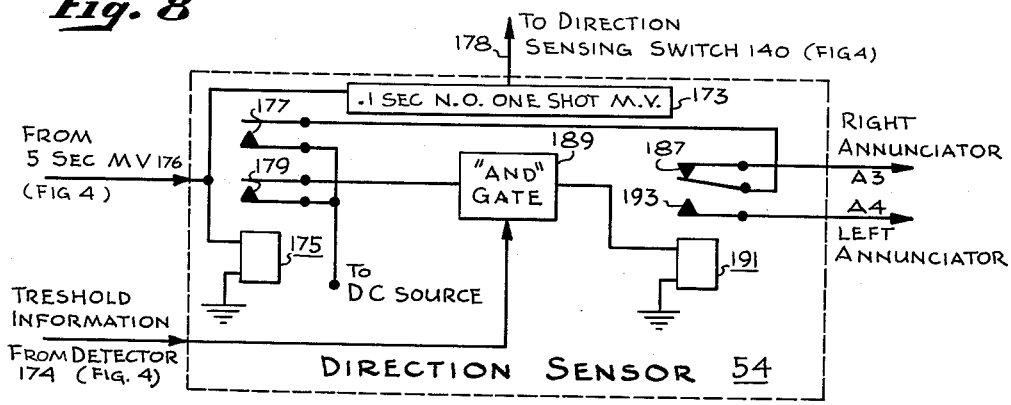
FIGURE 8 is a schematic illustration of a direction sensor circuit useful in the arrangement illustrated in FIGURES 4 and 6.

Referring to FIGURE 8, the direction sensor 54 will now be discussed in greater detail. As indicated above in connection with FIGURE 4, the output signal from the near range gate 53 is applied simultaneously, through line 172, to the 5 second multivibrator 176 and the threshold detector 174, the latter comprised essentially of a threshold circuit for providing a signal output only in the absence of a signal having an amplitude greater than that of a predetermined minimum value.

The 5 second multivibrator output is fed through a double pole, normally open relay 175, closing both sets of contacts 177 and 179 thereof. One set of contacts 177 feeds current from a direct current source through one set of contacts 187 of a double pole relay 191 momentarily actuating a right annunciator 180 of the annunciator bank 36 (FIGURE 7), and the other set of normally open contacts 179 feeds a signal into an "and" gate 189. The multivibrator output is also fed through a .1 second, normally open, one-shot multivibrator circuit 173 for momentarily producing a signal through a line 178 to the antenna disabling direction sensing switch 140 (FIGURE 4). The signal to the direction sensing switch 140 cuts out one of the antenna circuits from the direction sensor 54. If the return signal was being received through an antenna not cut off (say the down antenna) by the direction sensing switch 140, the normally closed contacts 187 continue to pass current and the initially indicated signal continues to pass through line A3. Since the normally open multivibrator 173 operates to cut off one of the antenna circuits for only .1 second, the antenna circuit is quickly restored to operation for the receipt of signals indicative of collision threats contemporaneous with the first detected collision threat. However, if the antenna circuit controlled by the direction sensing switch 173 is the circuit through which the return signal was received, a threshold information signal from the detector 174 (FIGURE 4) is fed into the "and" gate 189 together with the signal being received from the 5 second multivibrator 176. The coincidence of these last named signals in the "and" gate 189 causes a current to be passed through the relay 191 closing a normally open set of contacts 193 and opening the normally closed set of contacts 187. This action effects the actuation of an opposite annunciator indicator through line A4. The momentary presentation of a signal on line A3, when an ultimate signal is to be presented on line A4, does not provide directional indication ambiguity in view of the exceedingly short period of time that the opposite indication is presented. If the directional information is presented by a signal light, the normal thermal lag inherent in light bulbs will prevent the wrong bulb from even momentarily lighting.

*Collision Detecting Zones*

FIGURES 5a and 5b are concerned with an aspect of the over-all system with which the present invention has especial concern, namely, the collision detection channel 33. In the collision detecting channel 33 only those return signals indicative of a distance and velocity combination that would cause a collision threat to arrive at the location of the observer within a predetermined time, say the 15 seconds referred to, are candidates for generating collision warning information.

Referring to FIGURES 5a and 5b, it is observed that the output of the intermediate frequency amplifier 43 (FIGURE 4) is conveyed by means of a circuit path 182 to the Doppler detector or mixer 98 previously referred to. The Doppler detector 98 also receives a Doppler reference signal from terminal M derived from the output of the Doppler reference or buffer amplifier 96 (FIGURE 3). The relative velocity of a detected object with respect to the observer aircraft can be determined by examining the frequency of the signal delivered by the Doppler detector 98 to its output terminal 190. The frequency of the signal will vary about a mean of zero frequency since the Doppler detector 98 is essentially a heterodyned mixing device, mixing the output of the intermediate frequency amplifier 43 with the output of the Doppler reference amplifier as received through line M. If the frequency of the signal delivered by the Doppler detector 98 is in one direction with respect to zero frequency, this may arbitrarily indicate a velocity representing a closing of the detected object with respect to the observer aircraft. If, on the other hand, the output of the Doppler detector 98 comprises a frequency on the other side of zero, this will represent a velocity in an opposite direction, namely, a departing velocity.

The apparatus of the invention shown generally in FIGURES 5a, 5b, and 6 is employed in order to determine and extract the necessary velocity information from the signal delivered by the Doppler detector 98, through a Doppler amplifier 192, and relay this information to the zonal ranges 1 through 5 (FIGURE 1) in which a given object is maintaining the velocities thus detected.

The distance and velocity ranges are determined by the following considerations: As to distance, each distance gate must have a distance range wide enough to track the detected object at least as long as the 3 second observation time referred to, this being the time required to observe and process information received by the system in order to determine whether the received signal represents information or noise, and if the signal represents information, to analyze the information. Each of the range gates associated with one of the zones 1 to 5 covers a region between specified maximum and minimum distance values. Starting with a maximum range of 10,000 feet for the range gate associated with zone 5, the maximum range of each of the other range gates of zones 4 through 1 is smaller than that of the previous higher numbered zonal range gate by a factor of about .7, as indicated in the table of FIGURE 12. The successive minimum distance ranges are also in the same ratio. The distance range difference between the maximum and minimum distance settings is the product of the observation time (3 seconds) and the highest closing velocity associated with the given distance range gate. For example, the highest closing velocity in zone 5 is 1,000 feet per second. Consequently, the distance range gate associated with this zone 5 is constructed to be capable of tracking over a distance range of three times 1,000, or 3,000 feet.

As to velocity, the velocity range associated with each distance range is determined in the following manner. At the maximum setting of each distance range gate a maximum closing velocity is chosen such that the gross time element involved will be 10 seconds, this gross time element being taken as the minimum time that can be allowed for the handling of information and the initiation of the desired warning signal. The ratio between the minimum and maximum velocity ranges to be handled within any distance range gate or zone is then taken as approximately .7 to 1, it being observed that in any velocity interval the lower closing rate corresponds to the greater gross time element.

As indicated in FIGURES 5a and 5b, the present invention contemplates the use of two radar Doppler analyzing circuits, one circuit 80 (FIGURE 5a) responsive only to far range information, that is, information received from objects in zones 4 and 5, and the other circuit 82 (FIGURE 5b) responsive only to near range information, that is, information with respect to objects in zones 1, 2, and 3. In each of the Doppler analyzing arrangements of FIGURES 5a and 5b, range gates 194 and 196, and range gates 198, 200, and 202, respectively, are followed by frequency selective Doppler signal processing circuitry. Inasmuch as each of the zones 1 through 5 (FIGURE 1) is associated with critical velocity and distance combinations which together indicate a potential collision, in accordance with the present invention, each of the range gates 194, 196, 198, 200, and 202, is associated with a particular set of Doppler filters. For example, in FIGURE 5a, the range gate 196 that passes signals indicative of signals within zonal range 5 (distances lying between the range $d_{10}$ and $d_{11}$ which, by way of example have been indicated in FIGURE 12, correspond to distances of from 10,000 to 7,000 feet from the observer aircraft) is controlled by a blocking oscillator 240 which in turn is timed by a pickoff circuit 242. In the distance range $d_{10}$ to $d_{11}$ there is established by the above collision threat considerations a range of velocities V9 to V10. This range of velocities are covered by four velocity gating circuits, often referred to as Doppler or band pass filters 212, 214, 216, and 218, respectively. Likewise, the critical velocities falling in zone 4, distance ranges $d_8$ to $d_9$, may be regarded as covering a velocity range of from V7 to V8. This latter velocity range may be covered by fewer Doppler filters, for example two in number such as 208 and 210, respectively. In the near range collision detection zones 1, 2, and 3, processed in circuitry shown in FIGURE 5b, range gates 198, 200, and 202 may be employed for establishing the zones 1, 2, and 3, respectively. By way of example, two Doppler or band pass filters have been associated with the output of each of these near range gates 198, 200, and 202. Thus, the range gate 202 of zone 1 is associated with two Doppler filters 220 and 222, respectively, which taken together cover the critical velocity range of V1 to V2. With the output of the zone 2 range gate 200, two Doppler filters 224 and 226 are employed for giving coverage to the critical velocity range V3 to V4. Similarly, Doppler filters 228 and 230 are connected with the output of the zone 3 range gate 198 to cover the critical velocity range V5 to V6. Examples of actual values to which these velocity and distance designations may relate, are shown in the chart of FIGURE 12.

From the foregoing it is seen that in accordance with the invention each of the far range and the near range Doppler analyzer circuitry 80 and 82 assigns a plurality of Doppler filters to the output of any given range gate. The present invention takes advantage of this plurality of filters to reduce the effect of noise, especially thermal noise, upon the output signal of the Doppler filters so that the presence and the nature of the information signal can be more easily analyzed. Furthermore, in accordance with the present invention, the far range Doppler analyzing arrangement shown in FIGURE 5a, the analyzer arrangement provided for objects received in zones 4 and 5, is provided with a novel type of range gate which may be descriptively termed an "open loop" tracking gate. Each of these open loop tracking range gates, which track at a rate corresponding to the expected rate of distance change of the object whose presence is to be detected, are to be distinguished from closed loop tracking arrangements, the latter (exemplified in the aforementioned copending patent application) being effective to track at a rate directly determined by the measured rate of change characteristics of the detected return signal. Since the open loop tracking arrangement of the invention does not depend on measured characteristics of a detected return signal to directly control the rate of tracking, this tracking arrangement is free of complex servo circuits and enjoys a relatively greater noise immunity (the presence of noise in the return signal has substantially no effect on the tracking rate). On the other hand, the near range gates associated with the Doppler analyzer 82, shown in FIGURE 5b, are provided with non-tracking range gates. The reason for the foregoing is to take advantage of the greater signal intensity of return radar pulses associated with objects closer to the observer aircraft; thus, each of the nearer range Doppler filters may embrace a larger frequency range without greatly reducing the signal-to-noise ratio for near range signals. On the other hand, for far range signals, which may be greatly attenuated due to the greater distance of the detected object from the observer aircraft, the amount of information passed by each range gate is reduced at any particular time to that falling within, for example, a 1 microsecond period as will be made clear in connection with the showing of FIGURE 11 (periods 232 of FIGURE 11). If the distance range to which each far range gate 194 and 196 is made responsive is changed in timed relation with respect to the mean velocity of the Doppler signal being received, a given return signal may be effectively tracked by the changing distance range. Thus, with respect to the over-all distance range designated zone 5, and illustrated in FIGURE 11, the effective response of gate 232 is moved between distance 234 and distance 236, in a direction going from the upper portion of the range of zone 5 to the lower portion of this range. The movement or tracking of the zone 5 range gate 232 through zone 5 is at a rate corresponding to the mean velocity expected in the range gate being tracked. For example, as illustrated in FIGURE 11, for a mean velocity $m$, at time interval A, the signal will fall in the center of the range gate and remain at the center of the range gate through the tracking as illustrated by successive time intervals B and C where signal $m$ is shown to remain in the center of the range being tracked. For objects having velocities slightly greater or slightly less than the mean velocity, the range gate 232 will still track these objects since in accordance with the present invention the 1 microsecond range gate is wide enough to accommodate these slightly different velocities. Thus, for example, if a faster than mean velocity object, indicated at points $f$, is passed through the range gate 232, the return signal $f$ will appear at one edge of the range gate during one time period during the tracking and at the opposite edge of the range gate during the last time period during the tracking. In actuality, since the open loop tracking referred to is initiated by the detection, in the tracking zone 5, of a signal having the distance and velocity parameters to which the zone 5 circuitry is responsive, the tracking is preferably initiated by the detection of the presence of a target at a distance (for example 250 feet) greater than the greatest distance (10,000 feet) to which the circuitry is responsive in order that the detected target fall in the center of the 1 microsecond gate at the start of the tracking cycle. The reason for this is that the substantially different from mean velocity target may not be tracked by the tracking circuitry for the substantially entire duration of the tracking cycle if the target signal fell at the starting edge of the 1 microsecond gate at the start of the tracking cycle.

Since the four Doppler filters 212, 214, 216, and 218, respectively, are provided for zone 5 (these filters having mean velocities referred to by numerals 1 through 4 in FIGURE 11) the system of the invention is adapted to simultaneously track at each of the four different mean velocities so as to accommodate any object velocity within the range of object velocities to be handled by zone 5. Typical values for these mean velocities 1 through 4 are designated in FIGURE 5 by, respectively, mean velocities 737.5 feet per second, 812.5 feet per second, 887.5 feet per second, and 962.5 feet per second. Since each of the Doppler filters 212 through 218 is adapted to accommodate an actual velocity within 37.5 feet per second on either side of the mean velocity, zone 5 is thus adapted to track at any velocity range between 700 feet and 1,000 feet per second.

In the circuit of FIGURE 5a, let it be assumed that a target is detected in zone 5. The output of the Doppler detector 98 (FIGURE 4), having been amplified by the Doppler amplifier 192 (FIGURE 4), is applied from terminal Q1 in FIGURE 4 to terminal Q1 in FIGURE 5a. (As will be later discussed, the Doppler detector output is also applied to fixed range gates covering zones 1 through 3 as shown in FIGURE 5b.) The Doppler signal thus received is applied simultaneously to the zone 4 and zone 5 range gates 194 and 196, respectively. Each of the range gates 194 and 196 are served by separate blocking oscillators 204 and 240, respectively, controlled by separate pickoff circuits 206 and 242, respectively. The pickoff circuits 206 and 242 are connected to terminal P1 to be controlled by the sawtooth ramp generator 128 (FIGURE 4) in a manner analogous to the control of the pickoff circuit 158 described with respect to the far range guard channel 31 of FIGURE 4. Since the object being detected falls within the distance range $d_{11}$ to $d_{10}$, and the signal from the blocking oscillator 240 effectively opens only the zone 5 range gate 196 during the time the radar return signal is received, the return signal, in the form of a Doppler signal received through terminal Q1, will be applied simultaneously to the four Doppler filters 212, 214, 216, and 218, respectively, for zone 5. The output of each of the Doppler filters 212 through 218 are in turn applied to normally open sampling switches 244, 246, 248, and 250, respectively. If the Doppler signal passed through the zone 5 range gate 196 is representative of a critical closing velocity, which critical velocity bears an association to the distance range covered by zone 5 such that the detected object constitutes a potential collision threat, the Doppler signal will be passed through one of the Doppler filters 212 through 218 to its associated sampling switch 244, 246, 248, or 250.

While the signals are being processed through the various circuitry described above, a ring counter 252 (which may for example be a diode switching matrix driven by a multivibrator operating at a rate of 200 pulses per second) has been successively momentarily actuating each of the plurality of sampling switches 244, 246, 248, and 250, momentarily closing them in a successive manner. The output circuits of each of the sampling switches 244 through 250 are applied to a common output signal line 253 which feeds into an amplitude limiter 254 and then to a frequency discriminator 300. A portion of the output of the frequency discriminator 300 is, in turn, applied to a signal power level measuring threshold circuit 303 which delivers an output signal at terminal 256 thereof if the signal-to-noise ratio, as measured by the inverse power content of the direct current signal appearing at the output of the frequency discriminator 300, exceeds a predetermined threshold value. One such threshold circuit 303 and frequency discriminator arrangement is described, for example, in Patent Number 2,970,304, issued January 31, 1961, on an application, Serial No. 714,768, filed February 12, 1958, entitled "System for Detecting a Signal in the Presence of Noise," by Emory Lakatos, and assigned to the same assignee as the present invention. The output signal from the threshold circuit 303 is passed via the output line 256 to a stopping circuit 258 which stops the ring counter 252 and maintains the ring counter connected to the switch 244, 246, 248, or 250 to which the counter was connected at the moment the stopping switch was actuated. Thus, once a signal momentarily passes through any one of the Doppler filters 212, 214, 216, or 218, and passes through its associated sampling switch 244, 246, 248, or 250, respectively, the ring counter 252 is maintained stopped at its last position for holding the switch closed for the continued passage of the signal through the sampling switch. For example, assuming that the zone 5 range gate 196 has passed a Doppler return signal representing a velocity embraced within the range covered by the Doppler filter designated 212, this Doppler filter passes the signal through the switch designated 244 when the switch is momentarily closed by the ring counter 252. The signal passing through the switch 244 appears on the line designated 253 and, providing the signal is of sufficient amplitude, will cause an output signal to appear at the output of the threshold circuit 303 actuating the stopper circuit 258 and bringing the ring counter to rest for maintaining the switch 244 in its closed condition. The continuous application of signal information from the Doppler filter 212 to the output lead 253 will thus maintain the passage of this same signal through this line. This will maintain the presence of a threshold information signal at the output line 256 from the threshold circuit 303, which, as shown, is applied in a circuit path 260 to terminal U in FIGURE 5a. Shortly following the actuation of the sampling switch 244, by a time determined by a time delay network 262, a normally open slewing switch 264 will be actuated. The time delay network 262 has a delay a little greater than the time represented by the resting time of the ring counter 252 at each of its outputs so that the time delay network 262 will pass a signal through it only when the counter stops.

Figure 10:
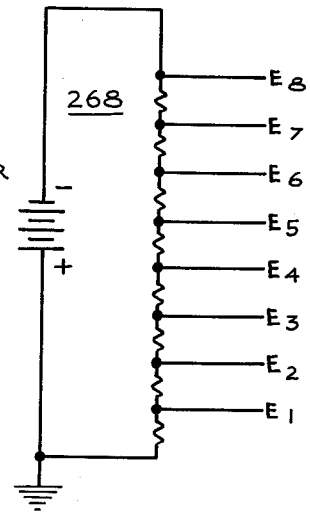
FIGURE 10 is a schematic illustration of a power supply arrangement useful in the system portion of FIGURES 5a and 5b.

The novel open loop tracking arrangement will now be discussed. There is applied to the input of the slew switch 264, through terminal 265 thereof, the potential previously stored on a capacitor 266 by virtue of the connection of this capacitor 266 to a power supply source 268 (FIGURE 10), the potential applied by the capacitor 266 is determined by the magnitude of the direct current potential $E_1$ at the charging terminal 270. The capacitor 266 is charged by the power supply source 268 through a charging resistor 272. On the closing of the slew switch 264 the potential stored in the capacitor 266 will tend to be discharged through the switch (through the circuit path indicated by dashed arrow 265a) and through a circuit path 274 to a common slew bus bar 276, the common slew bus bar 276 being connected to the threshold control terminals 278 and 280 of the pickoff circuits 206 and 242, respectively. As the capacitor 266 discharges through the time constant defined in part by a resistor 282 and the input resistance of the two pickoff circuits 278 and 280, a sawtooth ramp voltage of a duration corresponding to the collision threat candidate observation time referred to, for example 3 seconds, will change the timing or the distance range determined by the gating pulse delivered to the zone 5 range gate 196 in a precessing direction (direction $d$ in FIGURE 11). Thus the gate 196 will effectively move from a distance range 232 (FIGURE 11) adjacent to the far range boundary $d_{11}$ and toward a nearer range $d_{10}$ closer to the observer aircraft. The tracking of the target for the 3 second observation time is for the purpose of averaging out noise signals to determine whether the detected object is in fact present. If an object can be tracked for the entire observation time this fact is taken as an indication that the received signal was in fact a return signal indicative of the presence of a threatening object, and not noise or an object that has changed from a threatening to a non-threatening course. To produce this sawtooth slew voltage applied to the pickoff circuit 242 it is apparent that the value of the charging resistor 272 will be made considerably higher than the value of the time constant resistor 282. The time constant of the slew circuit associated with the slew switch 246 will be made compatible with the mean frequency embraced by the Doppler filter 212 through which the signal is being passed so that a target having mean velocity equal to $V9+V9a$ divided by 2 will be perfectly tracked by the slewing action of the slewing voltage on the pickoff circuit 242. The width of the gating pulse applied to the zone 5 gate 196 by the blocking oscillator 240 will, of course, be made sufficiently wide (for example 500 feet wide as indicated in the chart of FIGURE 12) to embrace, during the tracking action, targets having a velocity lower than the mean velocity but higher than velocity V9a as well as targets having velocity higher than the mean velocity but less than velocity V9. This tracking action, and the requirements for the relationship of the gating pulse duration and timing, for the various critical velocity and distance combinations, are shown by way of example in FIGURE 11. In FIGURE 11 mean velocity 1 corresponds to the mean velocity of signals passed through the first Doppler filter 212 of zone 5, and similarly, mean velocities 2 through 6 correspond to, respectively, the mean velocities to be handled by the Doppler filters 214, 216, 218, 208, and 210 of zones 4 and 5. By the same means as that described above with respect to zone 5, the zone 4 range gate 194 and Doppler filters 208 and 210 track a detected object over the 3 second observation time to determine whether the detected object has a velocity and distance combination which makes it a candidate for further consideration as a collision threat.

The range gates 202, 200, and 98 (FIGURE 5b) of, respectively, zones 1 through 3 operate in substantially the same manner as that described above with respect to zone 5 with the exception that, since no tracking is required in these near range zones, no slewing or tracking voltage circuitry is used in these near range Doppler analyzer circuits.

Signals indicative of critical velocity and distance associations are then examined to determine whether the particular angular direction of the collision threat candidate, relative to its speed and distance, is such that it is in fact a collision threat. Assuming now that the return signal corresponds to an object having a critical velocity and distance which can be successfully tracked by the zone 5 range gate 196, the tracking range gate 196 has a tracking time long enough so that the threshold information delivered at the threshold circuit output lead 256, and applied to the threshold information far range terminal U of FIGURE 5a, will be maintained for at least a 3 second interval, the tracking time being determined by the duration of the slewing signal applied to the pick-off circuit 280. This threshold information is then applied, as shown in FIGURE 6, to a far range collision predictor 84. In accordance with the present invention, it is the purpose of this far range predictor 84 to determine whether or not, during the 3 second observation time, the relative velocity of the object being detected changes by more or less a predetermined amount. If the object being detected is going to miss the aircraft by a predetermined distance, for example the 500 foot safe distance referred to, it will be apparent that the relative velocity as sensed by the Doppler radar system will decrease as the object approaches the observer aircraft. On the other hand, if the object and the observer aircraft are on a collision course or if their course is such as to bring the two within less than the predetermined safe distance, the closing velocity of the object as sensed by the system will remain substantially constant, that is, will change at a rate less than a predetermined rate of change.

If the determination is made that the object and observer aircraft are in fact on a collision or near collision course, the direction of approach of the object relative to the observer is determined by the far range collision direction sensor 88 so that the collision warning information applied to the annunciators 36, through lines A5 or A6 may take the form of an indication of the course of action to be taken by the observer to avoid the threatened collision.

Referring now to FIGURE 6 there is shown two collision predictor circuits 84 and 86, one designed for processing far range collision information and the other one designed for processing near range collision information.

It is the function of these two collision predictor circuits, respectively, to analyze the information delivered by the far range analyzer circuitry 80 of FIGURE 5a and the near range analyzer circuitry 82 shown in FIGURE 5b.

The far and near range collision predictor circuits, 84 and 86, respectively, are generally similar so that only the far range collision predictor circuit 84 will be discussed in detail. In analyzing whether a particular return signal has a rate of change of closing velocity within the range of rates of closing velocity changes for which a collision warning is to be given, the predictor circuit 84 must be relatively immune to noise modulation of the signal which may be such as to apparently completely obliterate a signal in a low signal-to-noise environment. The most prominent source of such noise is the effect of sudden gusts of air on the motion of the observer aircraft, on the target, or both, although noise due to thermal effects in the analyzing system of the invention, and due to glint (reflections of the transmitted wave from different portions of the target) are of a similar nature and are manifest in the received signal in substantially the same way. Considering now the far range analyzer circuit 80 of FIGURE 5a, a portion of the direct current output from the frequency discriminator 300 is applied to the threshold circuit 303 referred to. The frequency discriminator 300 (in combination with the limiter circuit 254) converts the Doppler signals received from any one of the six Doppler filters 208, 210, 212, 214, 216, or 218, respectively, into a direct current voltage proportional to frequency. A portion of the direct current voltage output from the discriminator circuit 300 is fed into a differentiator circuit 302 having an output appearing at terminal T. As indicated before, it is the purpose of the threshold circuit 303 to develop at the output terminal U thereof (after the transient voltage spike produced by the sudden application of the discriminator output to the differentiator) a direct current output only if there in fact exists a changing output from the frequency discriminator 300. Thus, at the differentiator circuit output T there will appear information relative to the acceleration or deceleration of the detected object and at the threshold circuit terminal U there will appear information as to whether the velocity of the aircraft, and in fact its Doppler return signal, continues to pass through one of the Doppler filters during the required observation time referred to.

Turning back to FIGURE 6, once the presence of a Doppler signal has been detected by means of the threshold circuit 303 (FIGURE 5a) a sequence of timing functions takes place for determining whether the detected object and observer aircraft are in fact on a collision course. First, a .2 second delay, one-shot multivibrator 314 is triggered by the signal from the terminal U connected to the threshold circuit output. At the end of the .2 second delay the output from the multivibrator 314 triggers a one-shot multivibrator 316 which has a time constant of 3 seconds. The purpose of the .2 second delay multivibrator 314 is to delay the processing of the information from the differentiator terminal T until after all transients produced from the differentiator circuit 302 (FIGURE 5a) have died out. The 3 second multivibrator 316 is used to establish the 3 second observation time referred to, as will hereinafter appear. The triggering of the 3 second, one-shot multivibrator 316 causes, at the end of the 3 second delay: (a) the triggering of a normally open differentiator control switch 304, closing it; (b) the opening of two normally closed shorting switches 330 and 350, opening them; and (c) the passage of a signal to an "and" gate 324, the "and" gate 324 being connected to the threshold terminal U to pass a signal through this gate 324 (and actuate a one-shot .1 second multivibrator 322) only on condition that a signal continues to be received from the threshold terminal at the end of 3 seconds. As to the last operation (c), if a receding rather than approaching target is being observed at one of the far ranges (zones 4 or 5), the signal from the target will spend less than 3 seconds in the range gate of the zone in which it is detected, and consequently, the 3 second observation time established by the multivibrator 316 substantially eliminates the chance of a false alarm. The "and" gate 324 combines the output of the 3 second multivibrator 316 with the output from the threshold circuit from terminal U so that if the threshold signal drops out in less than 3 seconds no signal will pass through the "and" gate 324 and no alarm will be given (an alarm being initiated by the closing of a normally open switch 310). By, in effect, sampling for the presence of a target only at the beginning and at the end of the 3 second period, momentary fading of the target for a small fraction of a second will have no effect on the receipt of a signal. The .1 second multivibrator 322 closes the normally open alarm control switch 310 for allowing the signal received through terminal T from the differentiator 302 (FIGURE 5a) to close an alarm control, 5 second, one-shot multivibrator 312. This effects the actuation of the desired alarm circuit in the annunciator bank 36 (FIGURE 7) for 5 seconds.

As preivously indicated in connection with FIGURE 5a, during the receipt of a return signal by any Doppler filter, 212, 214, 216, or 218, associated with the zone 5 range gate 196, a predetermined voltage $E_1$ (from the power supply 268 of FIGURE 10) is applied to terminal V through a bias supply or miss switch 338, 340, 342, or 344, respectively, in a path indicated by the dashed line arrow 338a, 340a, 342a, or 344a, respectively. As will be explained, the bias voltages supplied through the miss switches are used in determining the 500 foot safety distance beyond which the detected object is allowed to pass without the initiation of a collision alarm. A different bias value, one of bias values $E_1$ to $E_8$ (FIGURE 10), is applied through the bias supply or miss switch of each of zones 1 to 5 since the bias value is a measure of a certain critical minimum angle; this critical minimum angle, different for each of the zones 1 to 5, is the means of measure of the minimum distance (500 feet in this embodiment) that can be tolerated and still have the observer aircraft and detected object miss each other by a safe distance. This minimum angle is measured between two lines, one of which being a line connecting the observer aircraft and the detected object or collision threat candidate, and the other line describing the projected path of travel of the collision threat candidate.

As shown in FIGURE 6, the bias supply or miss reference information signal from terminal V is applied to a threshold bias developing circuit 348 and is then available to be subtracted from the output from the differentiator circuit applied to the combiner circuit 306 upon the closing of the normally open differentiator control switch 304. Upon the establishment (through terminal U) of a return signal strength or threshold level sufficient to actuate the one-shot, .2 second multivibrator 314, the one-shot, 3 second multivibrator 316 is actuated and, at the end of 3 seconds, it recycles to its original condition and allows the output from the combiner circuit 306 to be applied to an integrator circuit 308; this opens the shorting switches 330 and 350 so that the output from the combiner circuit 306 (which is a signal representative of the distance that the detected object will miss the observer aircraft) is no longer short circuited to ground. The integrator circuit 308, which preferably includes an amplifier, now receives the signal from the combiner circuit 306. If a threshold signal is still present on line U, indicating that the return signal is still being received at the end of the 3 second interval referred to, the "and" gate 324 passes a signal to the one-shot, .1 second multivibrator 322 for closing the normally open alarm control switch 310 and passing the output from the integrator circuit 308 to the one-shot, 5 second, alarm multivibrator 312. A signal of a desired nature will be present in the integrator circuit 308 only if, as determined by appropriate circuitry in the combiner circuit 306, the direct current voltage level (and thus the acceleration, or rate of change of velocity) is less than that corresponding to the miss distance involved. If sufficient voltage exists at the output of the integrator circuit 308 (corresponding to a signal from terminal T of less than the predetermined value) the 5 second multivibrator 312 will be actuated and for a period of 5 seconds an alarm signal will be applied to the far range collision direction sensor 88 (which operates through terminal 0 in the same manner as that described above in connection with FIGURE 8), the alarm signal being transduced by the far range collision direction sensor circuit 88 in a manner suitably actuating appropriate annunciators connected to the output terminals A5 and A6. These annunciators may be visual, panel 181 (FIGURE 7), aural, earphones 183, or tactile stimulators 185.

The near range collision predictor circuit 86 operates in a manner analogous to that explained above in connection with the far range circuit 84, input terminals W, X, and Y in the near range circuit 86 corresponding to terminals T, U, and V in the far range circuit 84.

The combiner circuit 306 may be operated in a slightly different manner from that described above in order to realize simpler operation. According to this alternate manner of operation a reference voltage or bias, from terminal V, representing the acceleration which corresponds to a given miss distance, is added to the signal from the differentiator. The polarity of this reference bias (negative in the embodiment shown by way of example) is opposite the polarity (positive) of the differentiator voltage representative of positive acceleration (that is, acceleration in a direction toward the observer aircraft). If this negative reference bias corresponds to the 500 foot miss distance referred to, then an acceleration signal (positive) corresponding to 500 feet will exactly cancel the bias signal (negative) so that no output is obtained from the combiner circuit 306. Accelerations greater or less than those representative of a 500 foot miss will then produce an output voltage which is positive or negative, respectively. Thus, a decision of whether the observed threat is on a collision course or not can be made on the basis of polarity alone.

In this different manner of operation the polarity of voltage at the output of the combiner circuit 306 will depend on whether the acceleration is greater or less than that represented by the value of the reference bias. A diode (not shown) in series with the input to the integrator circuit 308 allows only signals of one polarity (negative) to be passed. If the acceleration voltage is greater than the miss reference voltage from terminal V, corresponding to a safe miss distance, the combiner circuit output will be of such polarity (positive) that it will fail to pass the diode and consequently no alarm will be given. If it is of the opposite polarity (negative), corresponding to a miss distance less than that represented by the value of the reference voltage, the signal will be amplified and a warning given.

Figure 9:
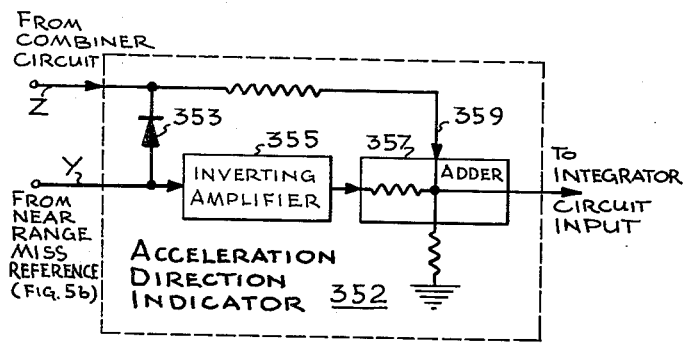
FIGURE 9 is a schematic illustration of a direction sorting circuit useful in a portion of the system of FIGURE 4.

While the far range zones 4 and 5 are inherently discriminative against detected objects that have critical distance and velocity combinations but are receding instead of approaching, by virtue of the tracking feature aforementioned, this inherent discrimination is not present with respect to objects detected in zones 1, 2, or 3. Accordingly, as illustrated in FIGURE 9, the alternate manner of operation of the combiner circuit 306 is used in providing discrimination against receding objects for objects within zonal ranges 1, 2, or 3. The output from the combiner circuit of the near range collision predictor 86 (which as indicated above is substantially similar to that of the far range zones) is fed into an acceleration direction indicator circuit 352 as shown in FIGURE 9, the output from the circuit being fed into the integrator circuit input. If the detected object is a receding aircraft going at a speed and velocity which would cause it to fall into one of the range and velocity gates of the near range zones 1, 2, or 3, processing of the information would start. However, since the receding aircraft has an acceleration in a direction opposite that of an approaching aircraft, advantage is taken of this fact for preventing the giving of an alarm in such a case.

The arrangement and operation of the circuit of FIGURE 9 will now be discussed. As indicated above, the input signal on line Z is taken to be positive in polarity for signals representative of approaching aircraft that will miss by a margin greater than the miss distance referred to. As has also been indicated, appropriate circuitry (for example a diode, not shown) may be provided for preventing such positive polarity signals from being passed through the near range collision predictor circuit 86 and initiating an alarm. In the acceleration direction indicator circuit 352 a diode 353, oriented to pass only negative signals, is connected to feed a portion of an incoming negative signal from the combiner circuit terminal Z into an inverting amplifier 355 which inverts and amplifies the signal received from the diode 353. The inverted output from the inverting amplifier 355 is fed into an adder circuit 357 which combines the inverted signal (positive) from the inverting amplifier 355 with the negative signal received directly from the combiner circuit through terminal Z and passes the resultant difference signal into the integrator circuit input. The diode 353 is biased by a connection of its positive side to a terminal Y from the near range miss reference (from FIGURE 5b), this bias corresponding to the tolerable miss distance. When a true collision indicating signal is received on line Z from the combiner circuit, that is, a negative signal that is more positive than the negative reference voltage received on line Y, the collision indication signal into line Z will pass directly into the adder 357, through input 359 thereof, and into the integrator circuit for the initiation of an alarm; this collision indication signal does not pass through the diode 353 due to the high negative bias placed on it through line Y. However, in the case of a receding target, the signal received from line Z will be more negative than the reference signal received on line Y. In such a case part of the signal from line Z will pass through the diode 353, and the amplified, inverted (positive) signal applied to the adder 357 will be of a positive polarity and magnitude such as to cancel the part of the signal received by the adder circuit 357 directly from line Z through input 359. Since, as indicated before, signals of positive polarity will not initiate an alarm, no alarm is given during the detection of receding objects.

The proper bias E corresponding to a given miss distance (the E value presented by the circuit of FIGURE 10) has been indicated, in the interest of simplicity of explanation, as being constant for each distance range of the far range zones 4 and 5. While this is an approximation, in actuality the bias level for greater accuracy is also determined by the velocity range handled in the same manner as that indicated in FIGURE 5b with respect to the near zones 1 to 3. Thus, the actual E value is given by the following relation:

$$E = -\frac{2}{\lambda} \frac{M_c^2 V_r^2}{R_g^3}$$

where $\lambda$ = wave length in feet,
$M_c$ = threshold miss distance, in feet,
$V_r$ = mean relative velocity, in feet per second, and
$R_g$ = maximum distance setting of the range gate involved.

Consequently, for a given $R_g$ and $M_c$, the value of bias is dependent on velocity, a different value of bias being preferably connected to each Doppler filter.

While the miss distance determination has been described with respect to the provision of a different bias value for each of a number of distance and mean velocity range associations, other miss distance methods may instead be used. For example, two separate, spaced-apart antennas may be provided, with each antenna like one of the two forwardly responsive antennas 23a and 23b of FIGURE 3 but spaced apart and similarly oriented, and information from each separate, spaced-apart antenna separately analyzed (as by separate receivers and distance range gating apparatus of a type similar to the ones indicated at numerals 11a, 11b, 45, 53, 80, and 82 of FIGURE 2), and the separately analyzed signals compared to give a difference signal. The instantaneous value of the absolute magnitude and the sign of the difference signal is representative of the rate of change of the angular orientation of the collision threat with respect to the observer aircraft. The rate of change of the absolute magnitude is a measure of the bearing of the collision threat and this is a measure of the closest approach that will be made by the collision threat; the sign of the difference signal is indicative of the side or direction (right or left, or depending on the antenna orientation, up or down) on which the collision threat will pass the observer aircraft. This directional information is useful in providing an even finer indication of the direction of the evasive maneuver required.

From the foregoing it is seen that the improved craft protective system of the invention is especially useful in providing protection against collision threat of different types.

We claim:
1. In a craft protective system including means for deriving signals having characteristics representing the distances and closing velocities between said system and objects moving relative thereto: at least one signal analyzing channel means receptive of said derived signals and connected to selectively pass those signals whose characteristics indicate that an object will arrive in the vicinity of said system within a given time interval after the reception of its associated signals by said channel means; said channel means including open loop tracking means connected to successively open portions of said channel means to the passage of different signals, thereby to increase the noise immunity of said system; and signal utilization means connected to said channel means to provide an output information signal whenever a signal passes through said channel means.

2. In an echo type range responsive system, signal analyzing apparatus of the type adapted to detect the presence of a moving object, said system comprising: means connected to derive signals having characteristics representing the distances and closing velocities between said analyzing system and an object moving relative thereto; said means including at least one signal processing channel means receptive of said derived signals and connected to selectively pass those signals whose characteristics indicate that an object will arrive in the vicinity of said system within a given time interval after the reception of its associated signals by said channel means; said channel means including open loop tracking means connected to successively open portions of said channel means to the passage of, respectively, successive ones of said associated signals, with the tracking means varying the open portion of said channel means in a manner corresponding to the manner of expected variation of a signal representative of an object whose presence is to be detected; and signal utilization means connected to provide an output information signal whenever a signal passes through said channel means.

3. In an echo type range response system of the type including radiation transmitting and receiving means connected to provide radiation return signals in the presence of an object in a region of space spaced from said system, a return signal analyzing arrangement comprising: a plurality of distance range gating circuits each adapted to be connected to said receiving means to pass only signals indicative of the presence of an object within a different respective predetermined distance range relative to said system; a plurality of velocity range gating circuits, with at least one velocity range gating circuit associated with each of said distance range gating circuits; a signal utilization circuit connectable to receive an output signal from a velocity range gating circuit; and means connected to sample each of said velocity range gating circuits for the presence of object-representing-signals and to connect a velocity gating circuit to provide an output in said utilization circuit only in the presence of a signal representative of a detected object having distance and velocity parameters to which said last-named velocity circuits and the distance gating circuit with which it is associated is sensitive.

4. In a craft protective system including means for deriving signals having characteristics proportional to the distances and closing velocities between said system and objects moving relative thereto, signal analyzing apparatus comprising: at least one signal analyzing channel receptive of said signals and connected to pass only those signals whose characteristics indicate that an object will arrive in the vicinity of said system within a given time interval after the reception of its associated signals by said channel, said channel including variable gating means connected to open, to the passage of signals therethrough, only a portion of said channel at one time, thereby to increase the noise immunity of said system; signal utilization means connected to said channel to provide an output information signal whenever a signal passes through said channel; said channel including a distance range gating circuit having variable distance range parameters and a plurality of velocity range gating circuits each responsive to a different velocity range and each connectable to receive a signal from said distance range gating circuit; switching means connected to successively connect each of said velocity range gating circuits to sample signals from said distance range gating circuit; and distance range control means connected to control the distance range parameters of said distance range gating circuit as a function of the velocity range gating circuit connected to said distance range gating circuit.

5. In a craft protective system including means for deriving signals having characteristics proportional to the distances and closing velocities between said system and objects moving relative thereto, signal analyzing apparatus comprising: at least one signal analyzing channel receptive of said signals and connected to pass only those signals whose characteristics indicate that an object will arrive in the vicinity of said system within a given time interval after the reception of its associated signals by said channel, said channel including variable gating means connected to open, to the passage of signals therethrough, only a portion of said channel at one time, thereby to increase the noise immunity of said system; signal utilization means connected to said channel to provide an output information signal whenever a signal passes through said channel; said channel including a distance range gating circuit having variable distance range parameters and a plurality of velocity range gating circuits each responsive to a different velocity range and each connectable to receive a signal from said distance range gating circuit; switching means connected to successively connect, for a predetermined length of time appreciably less than said first-named given time interval, each of said velocity range gating circuits to sample signals from said distance range gating circuit; and distance range control means connected to control the distance range parameters of said distance range gating circuit as a function of the velocity range gating circuit connected to said distance range gating circuit; said switching means including means halting the sampling of said distance range gating circuit by said velocity range gating circuits in response to the receipt of a signal by one velocity range gating circuit and connecting said one velocity range gating circuit to said distance range gating circuit for a period of time greater than said predetermined length of time.

6. The apparatus claimed in claim 5 wherein said distance range control means is constructed to be connected, by said switching means, to a direct current voltage whose magnitude is determined by the velocity range gating circuit connected to said distance range gating circuit.

7. In a craft protective system including means for deriving signals having characteristics proportional to the distances and closing velocities between said system and objects moving relative thereto, signal analyzing apparatus comprising: at least one signal analyzing channel receptive of said signals and connected to pass only those signals whose characteristics indicate that an object will arrive in the vicinity of said system within a given time interval after the reception of its associated signals by said channel, said channel including variable gating means connected to open, to the passage of signals therethrough, only a portion of said channel at one time, thereby to increase the noise immunity of said system; signal utilization means connected to said channel to provide an output information signal whenever a signal passes through said channel; said channel including a distance range gating circuit having variable distance range parameters and a plurality of velocity range gating circuits each responsive to a different velocity range and each connectable to receive a signal from said distance range gating circuit; switching means connected to successively connect, for a predetermined length of time appreciably less than said first-named given time interval, each of said velocity range gating circuits to sample signals from said distance range gating circuit; and distance range control means connected to control the distance range parameters of said distance range gating circuit as a function of the velocity range gating circuit connected to said distance range gating circuit; said switching means including means halting the sampling of said distance range gating circuit by said velocity range gating circuits in response to the receipt of a signal by one velocity range gating circuit and connecting said one velocity range gating circuit to said distance range gating circuit for a period of time greater than said predetermined length of time; said signal utilization means being connected to said velocity range gating circuits to provide an output information signal only on the receipt, from any one of said velocity range gating circuits, of a signal for a given time period greater than said predetermined length of time and less than said first-named given time interval.

8. The apparatus claimed in claim 7, further including frequency discriminator means connected between each of said velocity range gating circuits and said switching means to convert signals received from said velocity range gating circuits into direct current signals, and a signal power level measuring threshold circuit connected between said discriminator means and said switching means to pass a signal to said switching means only when the information content of the signal from said discriminator means exceeds a predetermined threshold value.

9. In a craft protective system including means for deriving signals having characteristics proportional to the distances and closing velocities between said system and objects moving relative thereto, signal analyzing apparatus comprising: a plurality of signal analyzing channels each receptive of said signals and connected to pass only those signals whose characteristics indicate that an object will arrive in the vicinity of said system within a given time interval after the reception of its associated signals by the channel, one of said channels including a distance range gating circuit having fixed range parameters and another of said channels including variable gating means connected to open, to the passage of signals therethrough, only a portion of said another channel at one time with said one channel being associated with a lesser distance range than that of said another channel, thereby to increase the noise immunity of said system; and signal utilization means connected to said channels to provide an output information signal whenever a signal passes through any one of said channels, said another channel including a variable distance range gating circuit having variable distance range parameters and a plurality of velocity range gating circuits each responsive to a different velocity range and each connectable to receive a signal from said variable distance range gating circuit; said another channel including means successively connectable to each of said velocity range gating circuits thereof to connect signals from one of said last-named circuits to control the distance range parameters of said variable distance range gating circuit.

10. In a craft protective system including means for deriving signals having characteristics proportional to the distances and closing velocities between said system and objects moving relative thereto: at least one signal analyzing channel circuit receptive of said signals and connected to pass only those signals whose characteristics indicate that an object will arrive in the vicinity of said system within a given time interval after the reception of its associated signals by said circuit, said circuit including variable gating means connected to open, to the passage of signals therethrough, only a portion of said circuit at one time, thereby to increase the noise immunity of said system; and signal utilization means connected to said channel circuit to provide an output information signal whenever a signal passes through said circuit; said channel circuit including a distance range gating circuit having variable distance range parameters and at least one velocity range gating circuit; and power level measuring means connected to control the distance range parameters of said distance range gating circuit in response to the power level of signals passing through said at least one velocity range gating circuit.

11. In a craft protective system including means for deriving signals having characteristics representing the distance and closing velocities between said system and objects moving relative thereto; at least one signal analyzing channel means receptive of said deriving signals and connected to pass thtose signals whose characteristics indicate that an object will arrive in the vicinity of said system within a given time interval after the reception of its associated signal by said channel means; open-loop tracking means in said channel means; sampling and control means responsive to said open-loop tracking means for providing sampling of the rate of change of said derived signal and to cease sampling and hold on the proper rate of change at the passage of a signal through said sampling and control means, said sampling and control means causing a shift of the tracking rate of said open-loop tracking means to the mean frequency of said incoming signal.

12. In a craft protective system including means for deriving signals having characteristics representing the distance and closing velocities between said system and objects moving relative thereto: at least one signal analyzing channel means receptive of said deriving signals and connected to pass those signals whose characteristics indicate that an object will arrive in the vicinity of said system within a given time interval after the reception of its associated signal by said channel means; open-loop tracking means in said channel means; sampling and control means responsive to said open-loop tracking means for providing sampling of the rate of change of said derived signal and to cease sampling and hold on the proper rate of change at the passage of a signal through said sampling and control means, said sampling and control means causing a shift of the tracking rate of said open-loop tracking means to the mean frequency of said incoming signal; said sampling and control means including a plurality of parallel connected sampling devices which are sequentially momentarily energized until said derived signal passes through one of said sampling devices.

13. In a craft protective system including means for deriving signals having characteristics representing the distance and closing velocities between said system and objects moving relative thereto: at least one signal analyzing channel means receptive of said deriving signals and connected to pass those signals whose characteristics indicate that an object will arrive in the vicinity of said system within a given time interval after the reception of its associated signal by said channel means; open-loop tracking means in said channel means; sampling and control means responsive to said open-loop tracking means for providing sampling of the rate of change of said derived signal and to cease sampling and hold on the proper rate of change at the passage of a signal through said sampling and control means, said sampling and control means causing a shift of the tracking rate of said open loop tracking means to the mean frequency of said incoming signal; said sampling and control means comprising: a plurality of parallel connected sampling devices which are sequentially momentarily energized until said derived signal passes through one of said sampling devices; sampling sequencing means connected to each of said sampling devices for sequentially energizing said devices at a time rate.

14. In a craft protective system including means for deriving signals having characteristics representing the distance and closing velocities between said system and objects moving relative thereto: at least one signal analyzing channel means receptive of said deriving signals and connected to pass those signals whose characteristics indicate that an object will arrive in the vicinity of said system within a given time interval after the reception of its associated signal by said channel means; open-loop tracking means in said channel means; sampling and control means responsive to said open-loop tracking means for providing sampling of the rate of change of said derived signal and to cease sampling and hold on the proper rate of change at the passage of a signal through said sampling and control means, said sampling and control means causing a shift of the tracking rate of said open loop tracking means to the mean frequency of said incoming signal; said sampling and control means comprising: a plurality of parallel connected sampling devices which are sequentially momentarily energized until said derived signal passes through one of said sampling devices; sampling sequencing means connected to each of said sampling devices for sequentially energizing said devices at a time rate; and hold means for providing said hold operation of said sampling sequencing means at the rate of change level of said incoming derived signal.

References Cited in the file of this patent

FOREIGN PATENTS 633,096     Great Britain  ----------- Dec. 12, 1949